(12) United States Patent
Davis et al.

(10) Patent No.: US 10,062,072 B2
(45) Date of Patent: Aug. 28, 2018

(54) FACILITATING SENDING AND RECEIVING OF PEER-TO-BUSINESS PAYMENTS

(71) Applicant: Facebook, Inc., Menlo Park, CA (US)

(72) Inventors: Stephen Moore Davis, San Francisco, CA (US); Vipan Reddy Raja Nalla, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 419 days.

(21) Appl. No.: 14/577,410

(22) Filed: Dec. 19, 2014

(65) Prior Publication Data

US 2016/0180325 A1    Jun. 23, 2016

(51) Int. Cl.
| | | |
|---|---|---|
| *G06Q 20/32* | (2012.01) | |
| *G06Q 20/10* | (2012.01) | |
| *G06Q 20/08* | (2012.01) | |
| *G06Q 20/40* | (2012.01) | |

(52) U.S. Cl.
CPC ....... *G06Q 20/3255* (2013.01); *G06Q 20/085* (2013.01); *G06Q 20/10* (2013.01); *G06Q 20/325* (2013.01); *G06Q 20/3224* (2013.01); *G06Q 20/40* (2013.01); *G06Q 20/407* (2013.01)

(58) Field of Classification Search
CPC .................................................. G06Q 20/3255
See application file for complete search history.

(56) References Cited

U.S. PATENT DOCUMENTS 8,649,803 B1 * 2/2014 Hamill ............... G06Q 30/0209
                                                    455/456.3
8,762,268 B2   6/2014 Wall et al.
2007/0011104 A1 * 1/2007 Leger .................. G06Q 20/085
                                                    705/77
2007/0255652 A1 * 11/2007 Tumminaro .......... G06Q 20/10
                                                    705/39
2010/0117806 A1 * 5/2010 Hong ..................... G06Q 30/06
                                                    340/10.4

(Continued)

FOREIGN PATENT DOCUMENTS

WO    WO 2013/006725 A2    1/2013
WO    WO 2016/099573       6/2016

OTHER PUBLICATIONS

Rogerthat, Message flow designer guide. Rogerthat [online], Nov. 27, 2013 [retrieved on Feb. 1, 2017]. Retrieved from the Internet: <URL: https://web.archive.org/web/20131127042129/http://www.rogerthat.net/guide/message-flow-designer-guide/.*

(Continued)

*Primary Examiner* — Elda G Milef
*Assistant Examiner* — Gregory S Cunningham, II
(74) *Attorney, Agent, or Firm* — Keller Jolley Preece

(57) ABSTRACT

The present disclosure relates to systems, methods, and devices for enabling peer to business payments using an integrated payment and messaging system. In particular, the integrated payment and messaging system allows users to send electronic payments as well as exchange messages with a merchant. The integrated payment and messaging system can improve security by allowing a user to make a purchase without having to provide sensitive financial information to the merchant. In addition, the integrated payment and messaging system can allow a user to make a payment for an order seamlessly during a conversation with the merchant.

20 Claims, 19 Drawing Sheets

(56) References Cited

U.S. PATENT DOCUMENTS

| | | |
|---|---|---|
| 2012/0143761 A1 | 6/2012 | Doran et al. |
| 2012/0158589 A1* | 6/2012 | Katzin .................. G06Q 20/12 |
| | | 705/44 |
| 2012/0271660 A1* | 10/2012 | Harris .................. G06Q 30/016 |
| | | 705/4 |
| 2012/0316992 A1 | 12/2012 | Oborne |
| 2013/0024371 A1 | 1/2013 | Hariramani et al. |
| 2013/0091058 A1 | 4/2013 | Huster |
| 2014/0089098 A1* | 3/2014 | Roundtree ............. G06Q 30/02 |
| | | 705/14.64 |
| 2014/0164199 A1 | 6/2014 | Wilkes |
| 2014/0222664 A1 | 8/2014 | Milne |
| 2014/0279123 A1 | 9/2014 | Harkey et al. |
| 2014/0279444 A1 | 9/2014 | Kassemi et al. |
| 2014/0279543 A1* | 9/2014 | Ruhrig .................. G06Q 50/01 |
| | | 705/44 |
| 2014/0351093 A1* | 11/2014 | Jeremias ............ G06Q 30/0625 |
| | | 705/26.62 |
| 2014/0365331 A1* | 12/2014 | Hafeez ............... G06Q 30/0631 |
| | | 705/26.7 |
| 2014/0372312 A1 | 12/2014 | Joao |
| 2015/0120509 A1* | 4/2015 | Moring .................. G06Q 20/12 |
| | | 705/26.81 |
| 2015/0227890 A1* | 8/2015 | Bednarek ......... G06Q 10/08355 |
| | | 705/26.81 |
| 2015/0348048 A1* | 12/2015 | Kurian ................ G06Q 30/016 |
| | | 705/304 |

OTHER PUBLICATIONS

Rogerthat [online], Message Flow Designer Guide, Nov. 27, 2013, retrieved on Feb. 1, 2017 from https://web.archive.org/web/20131127042129/http://www.rogerthat.net/guide/message-flow-designer-guide/.*

International Search Report as received in PCT/US2014/071758 dated Sep. 15, 2015.

Extended European Search Report as received in EP 15165490.2 dated Apr. 20, 2016.

EPO Office Action received in application No. 151654902 dated Oct. 18, 2017.

* cited by examiner

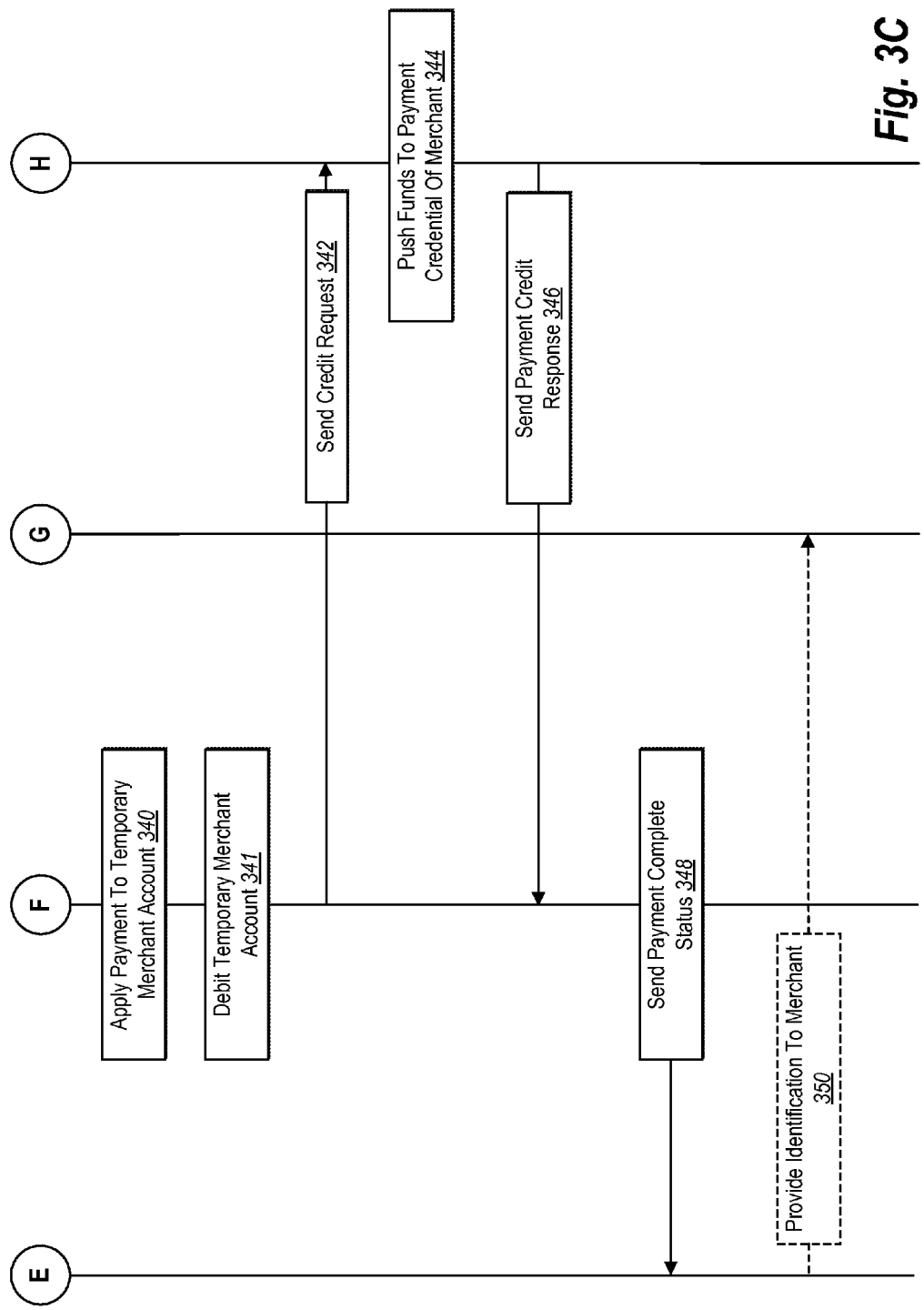

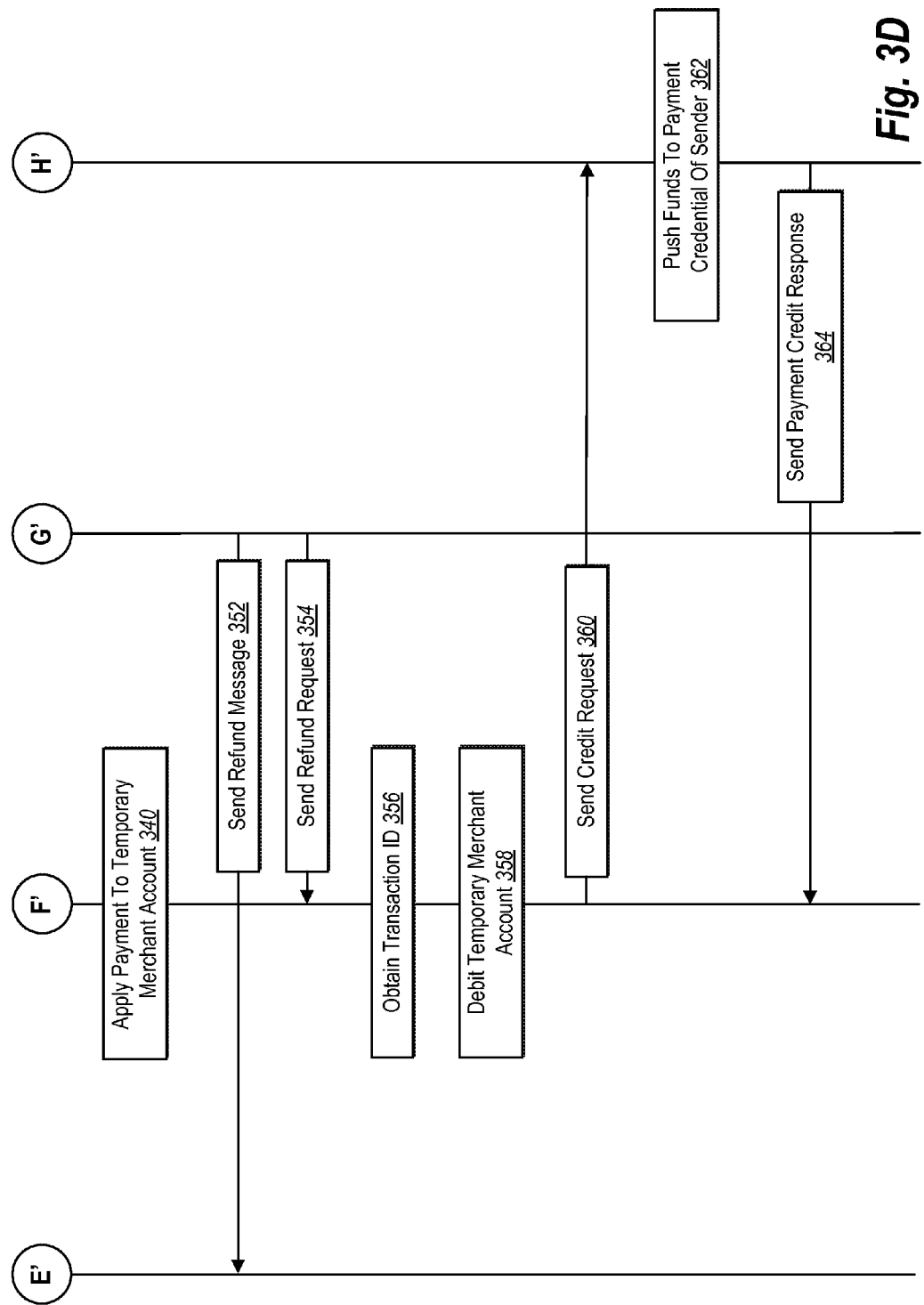

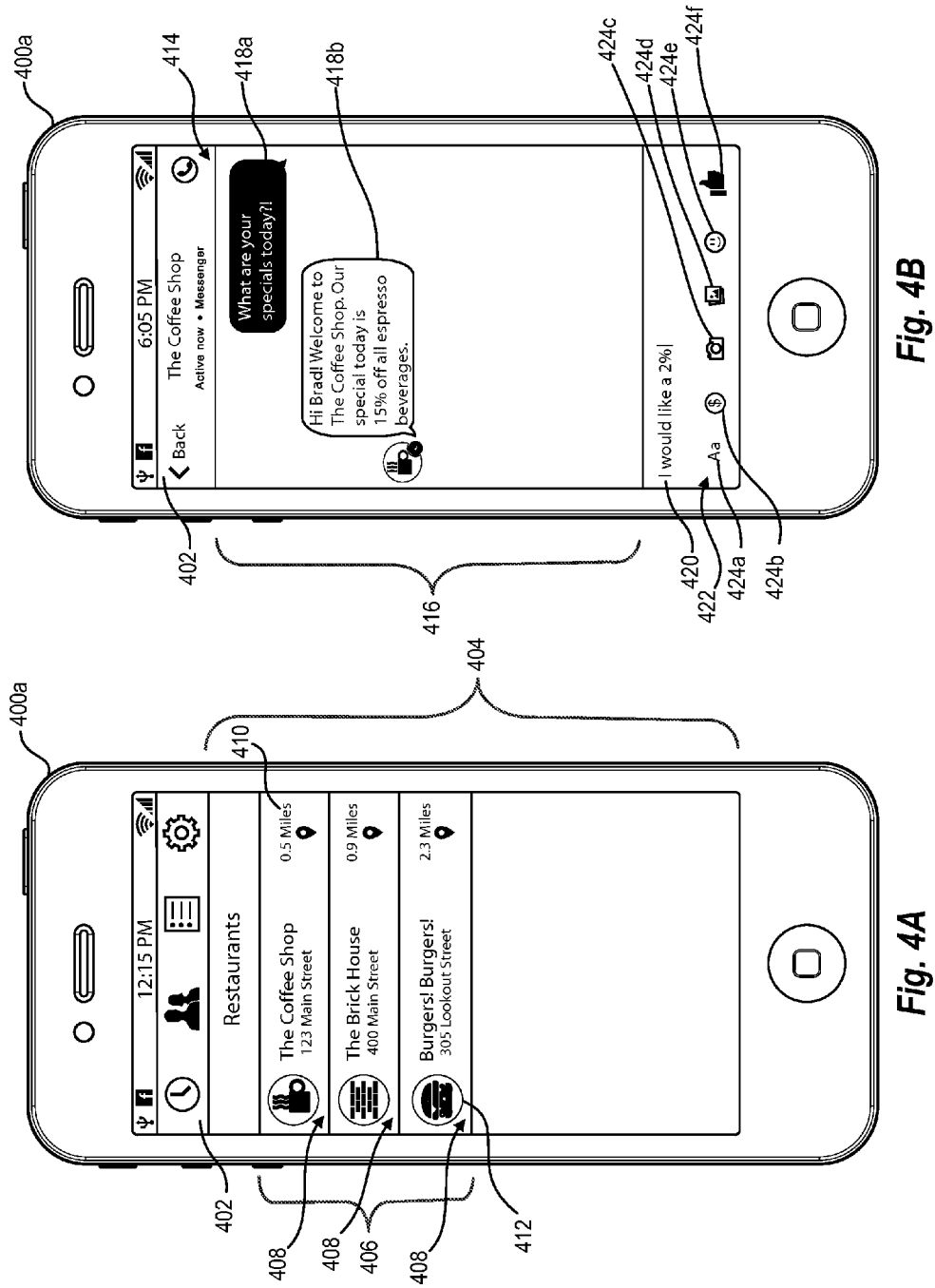

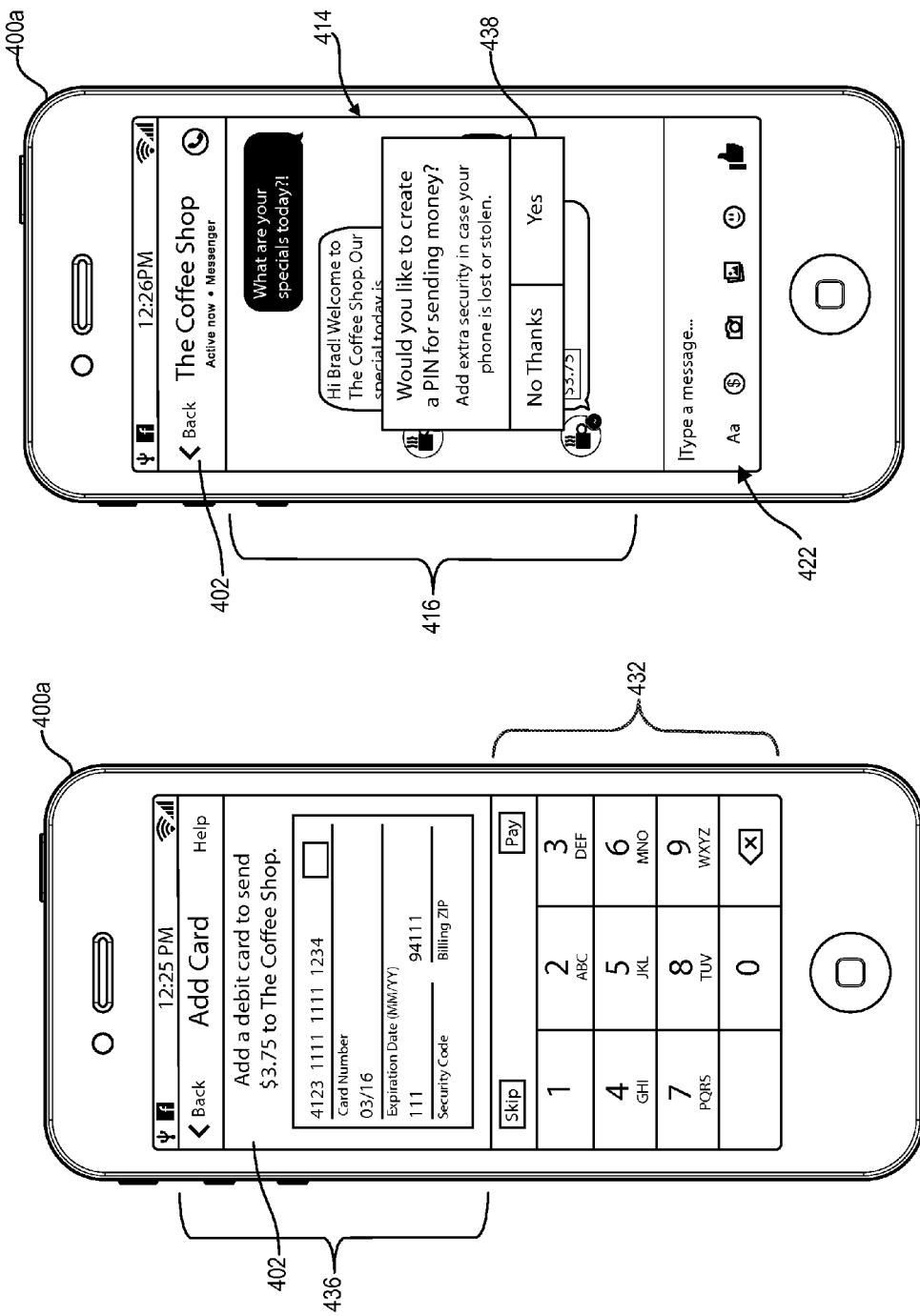

FACILITATING SENDING AND RECEIVING OF PEER-TO-BUSINESS PAYMENTS

BACKGROUND

1. Technical Field

One or more embodiments described herein relate generally to systems and methods for peer-to-business electronic payment transactions. More specifically, one or more embodiments relate to systems and methods of improving the ease and convenience of electronic payment transactions.

2. Background and Relevant Art

Electronic payment systems allow users to perform payment transactions with others via software applications on one or more types of devices (e.g., desktop devices and mobile devices). Some electronic payment systems allow users to perform payment transactions with merchants (i.e., peer-to-business payment transactions). Such electronic payment systems frequently allow users to order and pay for products from merchants.

Payment transactions between users and merchants typically require users to pay via one or more approved methods of payment (e.g., cash, check, credit card, debit card, gift card). Often times, particularly in the case of small businesses, merchants may only accept a few methods of payment to avoid contracting costs or transaction costs associated with one or more of the payment methods. Thus, a user desiring to purchase products or services from different merchants, each of which may accept different methods of payment, may be required to carry several methods of payment.

Additionally, using physical methods of payment can introduce several security risks. For example, using physical debit cards or credit cards to pay for products or services allows others (e.g., merchant employees, other customers) to see credit card numbers or other personal financial information. Exposing financial information to businesses can often result in employees or other customers stealing the financial information and using the information to commit fraud.

Many conventional electronic payment systems have several drawbacks that often cause users frustration, confusion, and result in an unsatisfactory payment process. One such drawback of conventional electronic payment systems is that they are typically standalone systems with limited functionality, which a merchant must implement and to which a user must subscribe. Specifically, some conventional electronic payment systems include proprietary software from the merchant that is limited to allowing users to interact with only a specific merchant. Other conventional electronic payment systems that allow users to perform payment transactions with different merchants often limit users just to performing payment transactions.

The limited nature of conventional electronic payment systems also adds inconvenience. In particular, the standalone nature of conventional electronic payment systems typically requires that users open a separate application dedicated just to payment transactions in order to send or receive a payment. The inconvenience of the standalone nature of conventional electronic payment systems can discourage users from using such systems.

Accordingly, there are a number of disadvantages with conventional electronic payment systems and methods.

SUMMARY

One or more embodiments described herein provide benefits and/or solve one or more of the foregoing or other problems in the art with systems and methods that increase the ease and convenience of electronic payment transactions with businesses. In particular, one or more embodiments provide a payment system integrated with a messaging system that allows a user to exchange messages with, as well as engage in, electronic payment transactions with a merchant. For example, the systems and methods can allow a user to send a business an electronic payment via a messaging interface that allows for the exchange of electronic messages with the merchant. The integration of an electronic payment system and a messaging system can provide users and merchants with the ability to send and receive electronic payments within the flow of a messaging thread. Thus, one or more embodiments allow users to communicate with merchants about a payment transaction and conduct the transaction without having to open a separate application dedicated to electronic payments.

The systems and methods can provide for a more secure transaction between a merchant and a consumer. For example, the system and methods of electronic payment transactions with businesses can allow a consumer to make a purchase without having to provide a merchant with sensitive financial information (e.g., credit card number). Furthermore, the systems and methods can allow a merchant to verify the identity of a consumer to help reduce instances of consumer fraud.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which:

FIGS. 3A-3D illustrate a sequence-flow diagram illustrating interactions as part of a payment process between a consumer and a merchant in accordance with one or more embodiments;

FIGS. 4A-4K illustrate user interfaces for completing a payment transaction in accordance with one or more embodiments;

DETAILED DESCRIPTION

Figure 1:
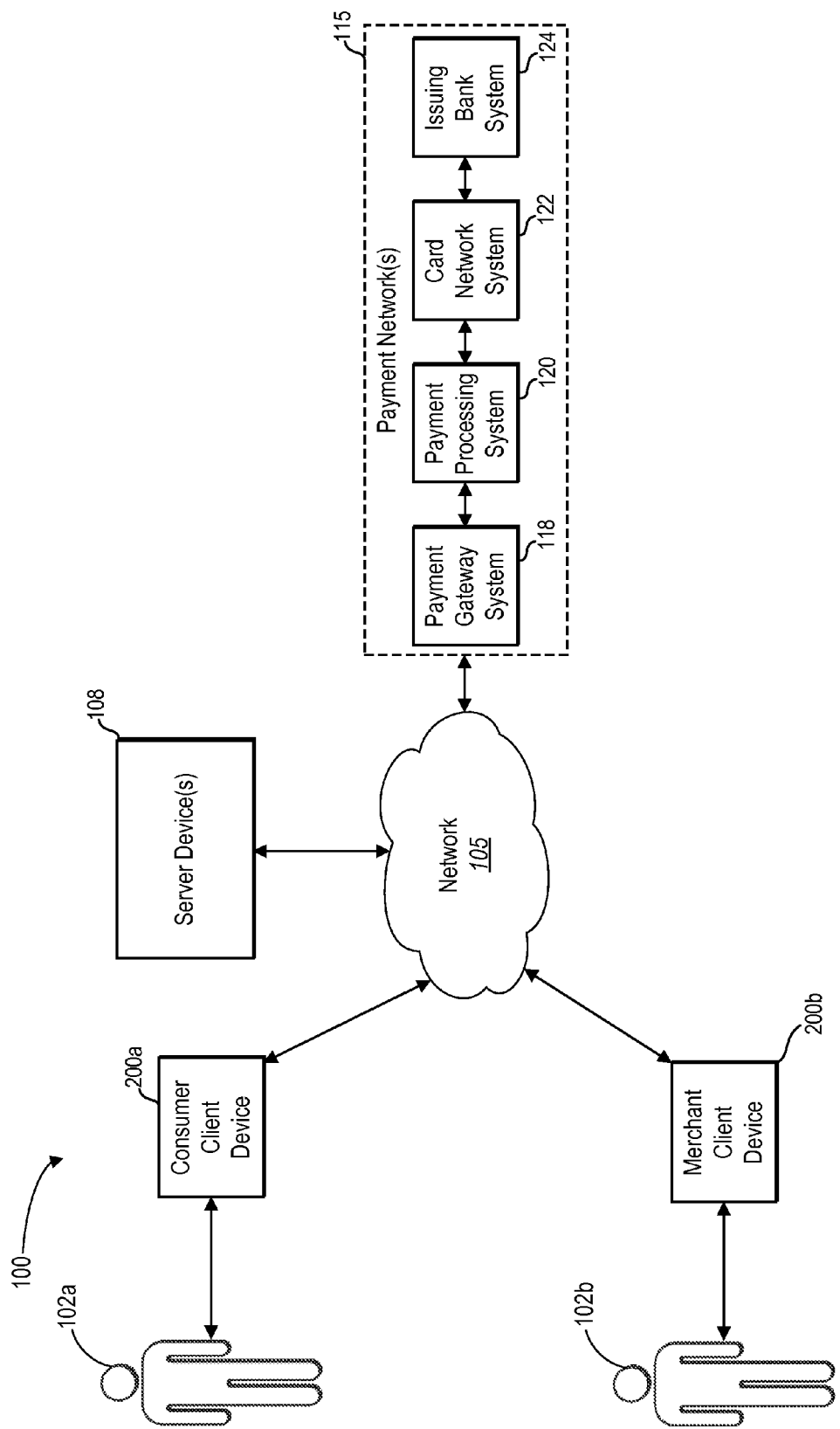
FIG. 1 illustrates a schematic diagram of an example system that facilitates the sending of messages and payments in accordance with one or more embodiments.

Embodiments of the present disclosure provide an integrated message and payment system that increases the ease and efficiency of making payments to a merchant. In particular, one or more embodiments provide an integrated message and payment system that integrates an electronic payment system and an electronic messaging system. The integrated message and payment system can allow a consumer to exchange messages with a merchant as well as send electronic payments to the merchant. For example, the integrated message and payment system can allow a consumer to send a merchant an electronic payment via a messaging interface that also allows for the exchange of electronic messages with the merchant.

By integrating an electronic payment system and a messaging system, the system can provide users with the ability to send and receive electronic payments within the flow of a conversation. Thus, the system can allow users to communicate about a payment transaction and conduct the transaction without having to open a separate application dedicated to electronic payments. The increased ease and efficiency of sending payments seamlessly during the exchange of messages provided by one or more embodiments of the system can lead to greater use of, and satisfaction with, electronic payments and increased spending with the merchant.

The integrated message and payment system can provide convenience in the processing of payment transactions for the purchase of a product. Specifically, the integrated message and payment system can allow a user to perform a payment transaction with a merchant to purchase a product within a messaging application. For example, the system can allow the user to initiate a payment transaction with a merchant while communicating with the merchant via the messaging application. Thus, the system can enable a user to easily interact with a merchant to inquire about and/or purchase a product from the user's device (e.g., a mobile device such as a smartphone).

In one or more additional embodiments, the system can allow a user to connect and/or communicate with merchants based on a location of the user. In particular, the system can detect a location of the user's client device and allow the user to find and interact with merchants nearby the user's location in a variety of ways. For example, the user can find nearby merchants that use the integrated message and payment system. The user can begin communicating with a particular nearby merchant in a messaging application even before arriving at the merchant's location. As such, the system can allow a user to obtain additional information about a product and to initiate a transaction to purchase the product from a merchant without even being at the physical location of the merchant.

Additionally, one or more embodiments of the system can simplify a method for processing refunds to users. For example, the system can provide a way for merchants to issue refunds to the user via the messaging application. Specifically, the system can allow a user to request a refund from a merchant from within the messaging application by associating a messaging thread between the user and the merchant with a transaction identifier tied to a payment transaction between the user and the merchant. Thus, the merchant can issue a refund to a user without requiring the user to give the merchant sensitive information (e.g., a card number) in a phone call or in person.

According to one or more embodiments, the system can also allow users to pay merchants via a variety of payment methods. In particular, the system can allow users to register a plurality of payment credentials with the system for use in payment transactions with merchants. For example, the system can allow a user to select one or more of a plurality of registered payment credentials to pay for a product from a merchant using the messaging application. Additionally, the system also may allow merchants to provide a plurality of different payment options to the user based on the preferences or requirements of the merchants. Thus, the system can provide versatility of payment methods in electronic payment transactions between users and merchants.

Furthermore, the system can allow a consumer to make a pay a merchant for a product or service without having to provide sensitive financial information (e.g., credit card number, checking account number) to the merchant. Thus, the system can provide increased security for the user. In particular, the user can avoid any fears of fraud when visiting a new merchant.

The system can also increase security for the merchant. In particular, the system can perform risk checks based on information maintained about the consumer by a social networking system. The system can deny a payment if the consumer is a known fraudster or if the payment appears fraudulent based on information about the consumer or the merchant maintained by the system.

As used herein, the term "message" or "messages" refers to any form of electronic communication between two or more computing devices. Messages can include text messages, photos, stickers or other icons, videos, voice recordings, music, voice mails, etc. In one or more embodiments, a message is an instant message communicated in real-time or near real-time. In alternative embodiments, however, a message can refer to any from of electronic communication, such as an SMS message, an email, or a social network post or comment.

In addition, the term "payment message" refers to a message that indicates payment information that allows the system to initiate a payment transaction. For example, a payment message can include a data package that includes a payment amount, a consumer, a merchant, a payment method, formatting indicating how the system processes the payment method, as well as additional information such as user provided text for a message.

As used herein, the term "payment transaction" refers to any type of electronic transaction exchanging currency or credits between two or more entities. For example, a payment transaction can be a financial electronic transaction between two users of the integrated message and payment system. In another example, a payment transaction can be a financial electronic transaction between a user and a financial institution or other multi-person entity. Additionally, a payment transaction can represent a monetary gift, a payment of a debt, a funding of a loan, a payment in consideration for a purchase of goods and/or services, or any other type of monetary transfer. In addition, a payment transaction can be made in one or more currencies and converted, based on an exchange rate for example, to one or more additional currencies.

As used herein, the term "account" or "payment credential" can refer to a user's debit card account, bank account, credit card account, messaging account, gift card, or any other account from which money can be deducted or to which money can be deposited. The meanings of the above terms, as well as additional terms, will become more apparent in light of the disclosure below with respect to the figures.

FIG. 1 is a schematic diagram illustrating an integrated messaging and payment system 100 in accordance with one or more embodiments. An overview of the system 100 is described in relation to FIG. 1. Thereafter, a more detailed description of the components and processes of the system 100 are provided in relation to the remaining figures.

As illustrated by FIG. 1, the system 100 can allow a user 102a to interact with a merchant 102b using corresponding client devices 200a, 200b. As further illustrated in FIG. 1, the client devices can communicate with server device(s) 108 via a network 105. In addition, the system 100 can include a payment network 115 communicatively coupled with the server device(s) 108 via the network 105. Although FIG. 1 illustrates a particular arrangement of the user/merchant, the client devices, the network 105, the server device(s) 108, and the payment network 115, various additional arrangements are possible. For example, the client devices 200a, 200b may directly communicate with the server devices 108, bypassing network 105.

As briefly mentioned above, FIG. 1 shows that user 102a can use a consumer client device 200a and merchant 102b can use the merchant client device 200b to communicate with one another via the server device(s) 108. For example, user 102a and merchant 102b can exchange electronic messages containing text, digital content (e.g., audio, images, video), location information, and other forms of data and information. For instance, the user 102a, using consumer client device 200a, can compose a message intended for the merchant 102b. After composing the message, the user 102a can cause the consumer client device 200a to send the message intended for the merchant 102b via the network 105 to the server device(s) 108. The server device(s) 108 can identify the merchant 102b as the intended merchant, and forward the message to the merchant client device 200b associated with the merchant 102b.

In addition allowing the users to exchange electronic communications, the system 100 can allow the users to send and receive monetary payments to and from one another. In one or more embodiments, the system 100 allows users to define and send a payment message to a merchant user. For instance, the system 100 can allow the user 102a to send a payment to the merchant 102b via the server device(s) 108 and the payment network 115. Likewise, the merchant 102b can receive notice of the payment, and accept or decline the payment. As will be explained in more detail below, the server device(s) 108 can communicate with the payment network 115 to coordinate a transaction that facilitates the payment between the users (i.e., their accounts).

While the system 100 can facilitate a payment between user 102a and merchant 102b, the system 100 can also facilitate a payment between more than two users, such as a group of users. For example, user 102a may send a payment to merchant 102b. In one or more embodiments, multiple users can send payments to the merchant 102b within the same payment transaction.

While FIG. 1 illustrates the users as people, the merchant can include an entity such as a business or government entity. For example, the user 102a can use the system 100 to provide a payment to the merchant 102b for services or products. For instance, the user 102a can communicate with the merchant via the system 100, and ultimately decide to make a purchase of a product or service from the merchant. Using the same system 100, the user 102a can then send a payment for the product or service to the merchant. Similarly, a merchant may send a payment (e.g., a refund) to other users.

Figure 7:
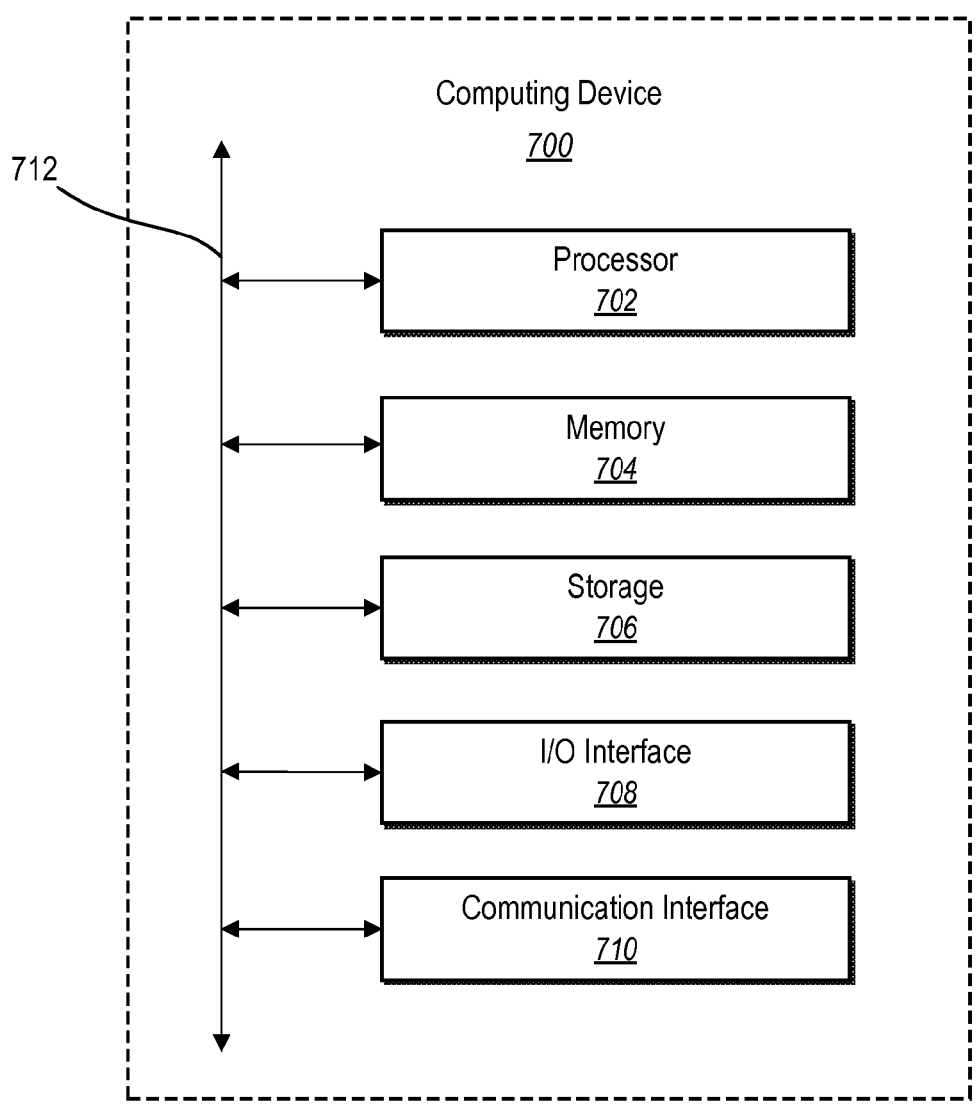
FIG. 7 illustrates a block diagram of an example computing device in accordance with one or more embodiments.

As mentioned above, and as FIG. 1 illustrates, the user 102a can interact with the consumer client device 200a and the merchant 102b can interact with the merchant client device 200b. Examples of client devices include computing devices such as mobile devices (e.g., smartphones, tablets), laptops, desktops, or any other type of computing device. FIG. 7 and the corresponding description provide additional information regarding computing devices. Moreover, and as mentioned above, the client devices can communicate with the through the network 105. In one or more embodiments, the network 105 includes the Internet or World Wide Web. The network, however, can include one or more private and/or public networks that use various communication technologies and protocols, as further described below with reference to FIG. 19.

As briefly discussed above, the system 100 can coordinate the sending and receiving of payments between users. For example, the user 102a can compose and send a payment message to the merchant 102b. For instance, the user 102a can provide input to via the consumer client device 200a to define the payment method (e.g., the consumer user's 102a credit card, debit card, account balance), payment amount, payment currency, payment description, and/or various other payment details.

From the user's 102a perspective, for example, the consumer user 102a can compose and send a payment message in a similar manner as sending a communication message (e.g., text). For example, in one or more embodiments, the user 102a can compose a payment message that indicates an amount of payment the user 102a desires to send to user 102b. After composing the payment message, the consumer user 102a can then send the payment message to the merchant 102b via the server device(s).

In one or more embodiments, the system 100 can coordinate a transaction between one or more accounts of the consumer user 102a and one or more accounts of the merchant 102b via the payment network 115. For example, in response to receiving a payment message from the consumer user 102a, the server device(s) can communicate transaction information to process a payment using one or more components within the payment network 115. Alternatively, or additionally, the system 100 can maintain one or more user accounts directly, and therefore, the system 100 can coordinate a transaction, or a portion of a transaction.

As illustrated in FIG. 1, the payment network 115 can include a payment gateway system 118, a payment processing system 120, a card network system 122 and an issuing bank system 124. In alternative embodiments, however, the payment network 115 can include more or fewer components depending on a particular embodiment of system 100.

In one or more embodiments, for example, the system 100 can communicate with the payment network 115 to authorize and process a transaction. For example, the system 100 can send a transaction to the payment gateway system 118, as shown in FIG. 1. Once the payment gateway system 118 receives the transaction, the payment gateway system 118 can send the transaction to the processor (e.g., payment processing system 120) used by a payment merchant user's acquiring bank. Based on the method of the payment (e.g., consumer user's account), the payment processing system 120 can transmit the transaction to an appropriate card network system 122. In many instances, the card network system 122 then sends the transaction to an issuing bank system 124.

The issuing bank system 124 either approves or declines the transaction, and sends the decision back to the card network system 122. The card network 122 then sends the decision to the payment processing system 120. The payment processing system 120 can then forward the decision to the payment gateway system 118, and in one or more embodiments, the payment gateway system 118 can maintain the details related to the transaction and the decision. The payment processing system 120 also sends the decision to the system 100.

In addition to authorizing a transaction, the payment network 115 can also perform settlement tasks. For example, the system 100 can coordinate with the payment gateway system 118 to submit a daily settlement batch including one or more captured transactions to an acquiring bank via the acquiring bank's preferred payment processing system 120. The payment processing system 120 then sends the settlement batch to a server of the acquiring bank (not illustrated), which records a deposit in the amount of each transaction within the settlement batch to an account associated with the merchant 102b.

The acquiring bank can then send a funding request in satisfaction of the deposit amount to the payment processing system 120, which passes the funding request to the appropriate card network system 122. The card network system 122 then sends the funding request to the issuing bank system 124. The issuing bank system 124 can post the transaction to the consumer user's account and pass a release of the funds to the card network system 122, which are then passed to the payment processing system 120, and then the acquiring bank. Additional details relating to the specific systems, methods, components and process of system 100 are described below.

Figure 2:
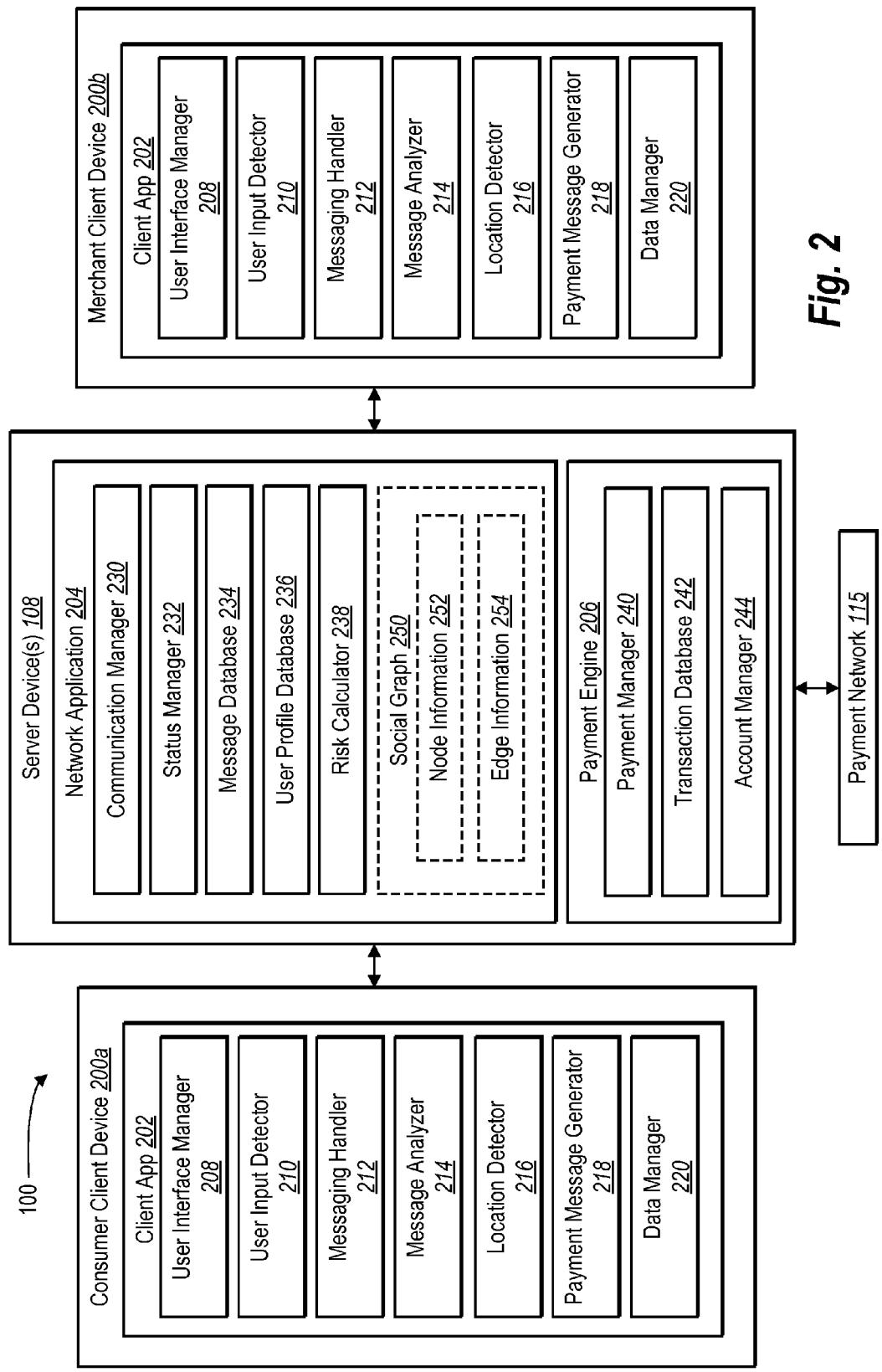
FIG. 2 illustrates a detailed schematic diagram of the system of FIG. 1 in accordance with one or more embodiments.

FIG. 2 illustrates a schematic diagram illustrating additional details of the system 100. As shown, the system 100 can include consumer client device 200a, merchant client device 200b, server device(s) 108, and payment network 115. In general, the system 100 can allow a user of the consumer client device 200a to send a payment to or receive a payment from a merchant client device 200b. Additionally, the system can allow the user of the consumer client device 200a to exchange messages with a user of the merchant client device 200b.

As shown, the system 100 can include various components on the client devices 200a, 200b and the server device(s) 108. For example, FIG. 2 illustrates that the client devices 200a, 200b can each include a client application 202 (e.g., a messaging application) with various components and the server device(s) 108 can include a network application 204 and a payment engine 206 with various components. The components of the client applications 202, the network application 204, and the payment engine 206 can work together to allow the users to send payments, receive payments, and exchange messages as described in greater detail below.

As shown, the client application 202 can include a user interface manager 208, a user input detector 210, a messaging handler 212, a message analyzer 214, a location detector 216, a payment message generator 218, and a data manager 220. FIG. 2 illustrates that the network application 204 can include a communication manager 230, a status manager 232, a message database 234, a profile database 236, and a risk calculator 238. As described below, the network application 204 can also optionally include a social graph 250, which includes node information 252 and edge information 254. FIG. 2 also illustrates that the payment engine 206 can include a payment manager 240, a transaction database 242, and an account manager 244. Each of the components 208-220, 230-244, 252, and 254 can communicate with each other using any suitable communication technologies. It will be recognized that although components 208-220, 230-244, 252, and 254 are shown to be separate in FIG. 2, any of components 208-220, 230-244, 252, and 254 may be combined into fewer components, such as into a single facility or module, or divided into more components as may serve a particular embodiment. While FIG. 2 describes certain components as part of the client applications 202 and other components as part of the network application 204, the present disclosure is not so limited. In alternative embodiments, one or more of the components shown as part of the client application 202 can be part of the network application 204 or vice versa. Similarly, one or more components shown as part of the network application 204 can be part of the payment engine 206 or vice versa.

The components 208-220, 230-244, 252, and 254 can comprise software, hardware, or both. For example, the components 208-220, 230-244, 252, and 254 can comprise computer instructions stored on a non-transitory computer-readable storage medium and executable by at least one processor of the client devices 200a, 200b or the server device(s) 108. When executed by the at least one processor, the computer-executable instructions can cause the client device(s) 200a, 200b or the server device(s) 108 to perform the methods and processes described herein. Alternatively, the components 208-220, 230-244, 252, and 254 can comprise hardware, such as a special purpose processing device to perform a certain function or group of functions. Additionally or alternatively, the components 208-220, 230-244, 252, and 254 can comprise a combination of computer-executable instructions and hardware.

In one or more embodiments, the client application 202 can be a native application installed on one of the client device 200a, 200b. For example, client application 202 may be a mobile application that installs and runs on a mobile device, such as a smart phone or a tablet. Alternatively, the client application 202 can be a desktop application, widget, or other form of a native computer program. Alternatively, the client application 202 may be a remote application that the client device accesses. For example, the client application 202 may be a web application that is executed within a web browser of the client device.

As mentioned above, and as shown in FIG. 2, the client application 202 can include a user interface manager 208. The user interface manager 208 can provide, manage, and/or control a graphical user interface (or simply "user interface") that allows a user to compose, view, and send messages as well as send payments. For example, the user interface manager 208 can provide a user interface that facilitates the composition of a message, such as an instant message. Likewise, the user interface manager 208 can provide a user interface that displays messages received from other users.

More specifically, the user interface manager 208 may facilitate the display of a user interface (e.g., by way of a display device associated with the corresponding client device). For example, the user interface may be composed of a plurality of graphical components, objects, and/or elements that allow a user to compose, send and receive messages or payments. More particularly, the user interface manager 208 may direct the client device to display a group of graphical components, objects and/or elements that enable a user to view a messaging thread.

In addition, the user interface manager 208 may direct the client device to display one or more graphical objects or elements that facilitate user input for composing and sending a message. To illustrate, the user interface manager 208 may provide a user interface that allows a user to provide user input to the client application 202. For example the user interface manager 208 can provide one or more user interfaces that allow a user to input one or more types of content into a message. As used herein, "content" refers to any data or information to be included as part of a message. For example, the term "content" will be used herein to generally describe, text, images, digital media, files, location information, payment information and any other data that can be included as part of a message.

As discussed above, one example of content that can be included in a message is a payment from a consumer user (e.g., a consumer) to a merchant user (e.g., a merchant). In one or more embodiments, the user interface manager 208 can provide a user interface to allow a user to easily and efficiently define and send a payment to one or more other users. For example, the user interface manager 208 can provide one or more input fields and/or one or more user selectable elements with which a user can interact to create and send a payment.

In addition to the forgoing, the user interface manager 208 can receive instructions or communications from one or more components of the client application 202 to display updated message information, updated status of the payment, and/or updated available actions. The user interface manager 208 can update an available option based on whether a particular option is available at a particular point within the transaction process. The user interface manager 208 can add, remove, and/or update various other selectable actions within the consumer and/or receiver status messages, as will be discussed below.

The user interface manager 208 can facilitate the input of text or other data to be included in an electronic communication or message. For example, the user interface manager 208 can provide a user interface that includes a keyboard. A user can interact with the keyboard using one or more touch gestures to select text to be included in an electronic communication. For example, a user can use the keyboard to enter a message to accompany and/or describe one or more other content items in an electronic communication. In addition to text, the user interface, including the keyboard interface, can facilitate the input of various other characters, symbols, icons, or other character information.

In one or more embodiments, the user interface manager 208 can also provide a different interface for different client devices. For example, the user interface manager 208 can provide different interfaces for consumers and merchants. Specifically, the user interface manager 208 can provide a user interface specifically designed for consumers if a client device is a consumer client device 200a. Similarly, the user interface manager 208 can provide a user interface specifically designed for merchants if a client device is a merchant client device 200b. In some instances, the different interfaces can have similar user interface elements that allow the users to communicate and enter into payment transactions with each other while providing one or more user-specific elements based on the type of user, as described in more detail below with respect to FIGS. 4A-4K.

As further illustrated in FIG. 2, the client application 202 can include a user input detector 210. In one or more embodiments, the user input detector 210 can detect, receive, and/or facilitate user input in any suitable manner. In some examples, the user input detector 210 can detect one or more user interactions with respect to the user interface. As referred to herein, a "user interaction" means a single interaction, or combination of interactions, received from a user by way of one or more input devices.

For example, user input detector 210 can detect a user interaction from a keyboard, mouse, touch pad, touchscreen, and/or any other input device. In the event the client device includes a touchscreen, the user input detector 210 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 210 may additionally, or alternatively, receive data representative of a user interaction. For example, user input detector 210 may receive one or more user configurable parameters from a user, one or more user commands from the user, and/or any other suitable user input. The user input detector 210 may receive input data from one or more components of the client application 202, from the storage on the client device, or from one or more remote locations (e.g., the network application 204).

The client application 202 can perform one or more functions in response to the user input detector 210 detecting user input and/or receiving other data. Generally, a user can control, navigate within, and otherwise use the client application 202 by providing one or more user inputs that the user input detector 210 can detect. For example, in response to the user input detector 210 detecting user input, one or more components of the client application 202 allow a user to select a merchant for a message, compose a message, select content to include in a message, and/or send a message to the merchant. In addition, in response to the user input detector 210 detecting user input, one or more components of the client application 202 allow a user to navigate through one or more user interfaces to review received messages, contacts, view a product listing, current and/or previous payment transactions, etc.

In one or more embodiments, in response to the user input detector 210 detecting one or more user inputs, the client application 202 can allow the user to create a payment to send to one or more other users. For example, a user wanting to send a payment can interact with a payment element provided on a menu within a user interface. Upon detecting the user interaction with the payment element, the user input detector 210 can cause the user interface manager 208 to provide a user interface for creating a payment. Therefore, in response to the user input detector 210 detecting one or more user inputs, the client application 202 can allow a user to create a customized payment that defines a payment to be sent to a merchant, as will further be described below.

As further illustrated in FIG. 2, the client application 202 can include a message handler 210 that manages messages provided to or sent from the client application 202. For example, the message handler 210 can interact with the user interface manager 208 and the user input detector 210 to coordinate the sending and receiving of messages using the client application 202. The message handler 210 may direct the sending and receiving of messages to and from the network application 204 over the course of an electronic messaging session among a plurality of participants. The message handler 210 may organize incoming and outgoing messages and direct the user interface manager 208 to display messages.

In one or more embodiments, the message handler 210 can facilitate receiving and sending data via the client application 202. In particular, message handler 210 can facilitate sending and receiving messages. For example, the message handler 210 can package message content to be included in a message and format the message in any necessary form that is able to be sent through one or more communication channels and using an appropriate communication protocol, as described herein. Likewise, the message handler 210 can process messages the client device 200a receives from other users.

In addition to providing communication functions for the client application 202, the message handler 210 can provide access to message data. For example, the message handler 210 can access data that represents a list of contacts, or one or more groups of contacts, to include and merchants to a message. To illustrate, the message handler 210 can obtain and provide data representing a contact list to the user interface manager 208 to allow the user to search and browse a contact list, and ultimately select an individual contact or group of contacts to include as merchants of a message. In one or more embodiments, a social-networking system can maintain remote contact list data (e.g., a "friends list"), and the message handler 210 can access the contact list data on the social-networking system for use within the client application 202.

The message handler 210 can also provide access to other local or remote data that the client application 202 can use to compose, send and receive messages. For instance, the message handler 210 can obtain access to files, images, audio, video and other content that a user can include in a message. Moreover, the message handler 210 can provide access to one or more functions of the consumer client device 200a to provide the user the ability to capture or create content to include within a message. For example, the message handler 210 can activate a camera, a microphone, or other function that allows the user to capture content to include in a message.

In addition, the message handler 210 can facilitate the sending of a payment. In particular, FIG. 2 illustrates that the client application 202 can include a payment message generator 218 that can generate a payment message that the message handler 210 can send to the network application 204 and/or to the payment engine 206 to initiate a payment process/transaction. For example, upon a consumer selecting a payment element on a user interface, the payment message generator 218 can create a data package that includes payment information received from the consumer. A payment message from the client device 200a can include an indication of an amount of money to be sent as part of the payment transaction as well as any necessary information to allow the network application to perform a payment transaction.

In one or more embodiments, the payment message generator 218 can create one or more data packages that include the payment amount, one or more consumer identifiers, one or more merchant identifiers, a transaction identifier, a messaging thread identifier, a product identifier, one or more payment methods or consumer account information, authorization information, currency information, a message or payment description, and/or any other data that may be helpful to facilitating a payment from the consumer to the merchant. Alternatively, a payment message can simply identify a merchant and an amount of a payment. The payment message generator 218 can pass the payment message (e.g., the data package that includes the payment information) to the message handler 210 to send to the network application 204.

The payment message generator 218 can also obtain payment information from various sources. For example, the payment message generator 218 can obtain payment information directly from the consumer via the user input detector 210. Additionally, or alternatively, the payment message generator can gain access to payment information maintained on the client device by the data manager 220. For example, the client application 202 can allow a consumer to input and save various payment methods and/or identify a default payment method, default currency, and otherwise specify other user preferences related to sending and/or receiving a payment.

In one or more embodiments, the payment message generator 218 can access and provide a token within a payment message. The token can reference a payment credential stored by the network application 204. For example, the payment message generator 218 can retrieve a token to include in, or with, the payment message that verifies the consumer and/or consumer client device 200a as authorized to make the payment using a payment credential stored by the network application 204.

According to some embodiments, the payment message generator 218 can generate separate payment messages to send to each of the network application 204 and the payment engine 206. Specifically, the payment message generator 218 can generate a first payment message for sending to the payment engine 206 for processing the payment transaction, and a second payment message (or other message associated with the first payment message) indicating a payment transaction for sending to the client device 200b via the network application 204. Alternatively, the payment message generator 218 can generate a single payment message for sending to both the network application 204 and the payment engine 206 in parallel.

As mentioned above, the client application 202 can further include a message analyzer 214. The message analyzer 214 can analyze messages sent from and received by the client application 202 for potential events. In one or more embodiments, the message analyzer 214 can infer the events from the electronic messages exchanged between users based on contextual content in the exchanged messages. Specifically, the message analyzer 214 can identify certain phrases or character strings that indicate an opportunity for a payment or an event associated with a payment. For example, the character strings can include predetermined character strings from electronic messages in a messaging thread between a user and a merchant.

The client application 202 can further include a location detector 216. The location detector 216 can access or identify a location of the client device based on GPS information from the client device, cell tower triangulation, WIFI received signal strength indication, WIFI wireless fingerprinting, radio-frequency identification, near-field communication, by analyzing messages, or based on data from other sources. The location detector 216 can then provide the location of the client device to the message analyzer 214 or the network application 204. Additionally, the location detector 216 can receive indications of the location of other client devices from the network application 204 and provide them to the message analyzer 214. For example, the location detector 216 can notify a user and/or a merchant when the location of the user is proximate a location of the merchant.

As discussed above, the client devices 200a, 200b can each include a data manager 220, as illustrated in FIG. 2. The data manager 220 can maintain message data representative of data used in connection with composing, sending, and receiving messages between a user and one or more other users. For example, message data can include message logs, contact lists, content, past communications, and other similar types of data that the client application 202 can use in connection with providing the ability for users to communicate using the client application 202.

The data manager 220 may also maintain payment data representative of information used to generate payment messages. For example, payment data may include a payment method data (i.e., a credential) and/or account data (e.g., bank or credit card account data). Furthermore, payment data can include payment preferences (e.g., a default payment method). In general, payment data can include any data that the payment message generator 218 can use in connection with generating a payment.

As briefly mentioned above, in addition to the client devices 200a, 200b, the system 100 can further include a network application 204 that is implemented in whole or in part on the server device(s) 108. In one or more embodiments of the present disclosure, the network application 204 comprises a social-networking system (such as but not limited to FACEBOOK™), but in other embodiments the network application 204 may comprise another type of application, including but not limited to an e-mail application, search engine application, banking application, or any number of other application types that utilizes user accounts.

In one or more embodiments where the network application 204 comprises a social-networking system, the network application 204 may include a social graph 250 for representing and analyzing a plurality of users and concepts. Node storage 252 of the social graph 250 can store node information comprising nodes for users, nodes for concepts, nodes for transactions, and nodes for items. Edge storage 254 of the social graph 250 can store edge information comprising relationships between nodes and/or actions occurring within the social-networking system. Further detail regarding social-networking systems, social graphs, edges, and nodes is presented below with respect to FIG. 9.

The communication manager 230 can process messages received from client applications 202. For example, the communication manager 230 can interact with a message handler 206 of a client application 202. The communication manager 230 can act as a director for messages sent back and forth among users in an electronic messaging thread. The communication manager 230 may receive a message (e.g., a payment message or a message indicating a payment transaction associated with a payment message) from client application 202, detect the intended merchant of the message, and send the message to the client application 202 (or device) associated with the intended merchant. One will appreciate that the communication manager 230 can direct a message for a merchant to multiple client devices associated with the merchant (i.e., each device upon which the user has installed a version of the client application 202).

Additionally, the communication manager 230 can also re-format or otherwise modify the content or format of a message based on the messaging protocol used by a destination communication device or a type. As such, in one or more embodiments the system 100 can allow participants using different communication platforms to exchange messages. For example, the communication manager 230 can receive a message in a first protocol (SMS, IM, XMPP, APNS, etc.), re-format the message into a second protocol, and send the reformatted message to the intended merchant(s).

The status manager 232 can track the status of users of the client applications 202 and/or the client devices 200a, 200b. For example the status manager 232 can identify when a user is logged into the client application 202, when a user is active on the client application 202, when a client device associated with a user or user account is online or active. The status manager 232 can send indications (such as push notifications) to the client application 202 to notify the client application 202 of the status of users, device, messages, or payments. The user interface manager 208 can add, modify, or otherwise change or update status notifications based on indications received from the status manager 232. For example, the status manager 232 can send an indication to the client application 202 indicating that another user has accessed a message, received a payment, sent a payment, is active, a device or device type a co-user is active on (e.g., mobile vs. web), etc. The user interface manager 208 in turn an update a user interface to notify a user of the status.

The network application 204 may also include a message database 234. The message database 234 can maintain message data representative of content of messages from electronic messaging sessions among a plurality of participants. The message database 234 may maintain status data representative of the information mentioned above that the status manager 232 tracks. The message database 234 can thus provide an archive of messaging threads, which the network application 204 can provide to a user on demand or once a user logs into the client application 202 using a new computing device.

As mentioned previously, the server device(s) 108 can include a payment engine 206 having a payment manager 240. The payment manager 240 of FIG. 2 can integrate the sending and receiving of payment messages and initiate payment transactions, and may employ one or more application programming interfaces (APIs). For example, upon the communication manager 230 receiving a payment message, the communication manager 230 can send any payment details to the payment manager 240. The payment manager 240 can then use the payment details retrieved from the payment message to initiate a payment transaction using the payment network 115.

The payment manager 240 can coordinate a transaction corresponding to a payment defined in a payment message. As generally explained above, the payment manager 240 can coordinate a transaction via the payment network 115 that corresponds to a payment message, monitor the status of the transaction, and provide status information regarding the transaction. More specifically, the payment network 115 can authorize a transaction, fund a transaction, and/or settle an individual transaction or batch of transactions as described above with reference to FIG. 1. In one or more embodiments, the payment manager 240 can use one or more application programming interfaces (API) to communicate relevant information with the payment network 115.

To complete a transaction, the payment manager 236 can access or obtain a payment credential for the merchant (such as deposit account information, debit card, credit card, gift card, electronic wallet). The payment manager 236 can obtain a merchant's payment credential using a variety of methods. In one example embodiment, a merchant can register one or more deposit accounts or other payment credentials with the network application 204. For example, the merchant can register a plurality of payment credentials for using with different merchants. Upon a user registering a deposit account or other payment credential, the user profile database 240 can maintain the payment credential.

After the payment manager 240 receives the payment information, the payment manager 240 can identify the merchant. The payment manager 240 can lookup the merchant in the user profile database 236 to determine if the merchant has registered a payment credential accepted by the merchant. Specifically, the merchant can set a preferred or required payment credential for use in payment transactions with users. At this point, the payment manager 240 can initiate the transaction.

In the event that the merchant's user profile does not include a payment credential, the payment manager 240 can direct the communication manager 230 to send the merchant a message prompting the merchant to provide a payment credential. The message may prompt the merchant to register a payment credential by providing one or more interactive fields that allows the merchant to provide payment credential details. Additionally, or alternatively, upon determining that a merchant does not have a registered payment credential, the payment manager 240 can generate a temporary deposit. In particular, the payment manager 240 can generate an account number and associate the account number with the merchant's user profile. In one or more embodiments, the merchant may already have a temporary account, and therefore, the payment manager 240 can use the previously created temporary account to complete the transaction. In particular, the temporary account allows the payment manager 240 to proceed immediately to process a transaction without delaying the payment process from the perspective of either the consumer or the merchant.

The account manager 244 can manage one or more temporary accounts in connection with the networking application. For example, upon completion of the payment, the payment manager 240 can deposit the payment amount to a temporary account. In one or more embodiments, the merchant (e.g., the merchant) can set up the temporary account with the account manager 244 prior to entering into any payment transactions with users (e.g., consumers). In one or more embodiments, the payment manager 240 can cause the communication manager 230 to send the merchant a notification when money is in the temporary account and ready to be transferred to the merchant's registered deposit account. In other embodiments, when a merchant refunds money to a consumer, for example, the payment manager 240 can cause the communication manager 230 to send the consumer a hyperlink and/or instructions for transferring money from a temporary account to a registered deposit account.

In addition to coordinating a transaction via the payment network 115, the payment manager 240 can also coordinate a transaction with respect to one or more system user accounts. In one or more embodiments, the payment engine 206 can support user cash accounts, such as gift card accounts, cash card accounts, or similar types of user accounts. The consumer can specify the consumer's user cash account as the method of payment, and likewise, the merchant can set a merchant cash account as the registered deposit account. Therefore, in at least some embodiments, the entire transaction, or substantially the entire transaction, can be processed within the payment engine 206.

The payment manager 240 of FIG. 2 may perform various functions with relation to coordinating the information received from the communication manger 230 to request and accept payment requests, and to coordinate the payment process. For example, the payment manager 240 can create and store payment credentials. More specifically, a user may already have accounts with the network application, and thus already be registered users, or may still need to set up an account. In one embodiment, at least some of the users can also be members of a social-networking system and already have identifiers ("IDs") and user profiles associated with social-networking accounts that are also used when messaging using the system 100. Alternatively, other users may not be members of the social-networking system and need to create an account to become a registered member of the system 100. In this example, the payment manager 240 can receive date from these users (via the client application 202) and create an account, and then create a unique ID and user payment profile for these users, which will be referenced later during the payment process. In some cases, the payment manager 240 may also augment user profiles of previous social-networking users to include payment profile features that may have been absent.

In setting up or augmenting the account, a user can submit one or more payment credentials, such as a credit card, a debit card, a deposit account or other bank accounts, gift card accounts, store credit accounts, etc. When adding methods of payment, the user can be required to submit card and/or account numbers, expiration dates, security codes, transfer or routing identification numbers, and bank information required for money transfers. The user can also create an authorization code such as a personal identification number (PIN), or use a security code of a credit card, e.g., when providing only a single payment method, or provide some other authorization code. The user can also select a default method of payment.

The user payment profiles stored by the user profile database 236, accordingly, can include user (or group) IDs created uniquely for each registered user (whether as a social-networking user and/or as a messaging user). The user profile database 236 can provide storage for payment credentials of users of the network application 204. For example, the user can create an "account" with the network application 204, which allows a user to provide the payment information to the network application 204. The network application 204 can then save that payment information in the user profile database 236. In one or more embodiments user profile database 236 can store in relation to the user one or more of: a first name, a middle name, a last name, a payment card number (e.g., a credit card, debit card), an expiration date (year and/or month) of the payment card, a card security code of the payment card (e.g., a Card Verification Value (CVV or CVV2)), a billing address (including street name, house number, city, state or province, zip code, country, etc.) associated with the payment card, a phone number associated with the payment card, one or more shipping addresses (including similar fields as the billing address). When the payment card comprises a debit card, the profile storage module can also store a personal identification number (PIN) for the debit card. In an embodiment where the network application 204 comprises a social-networking system, the payment information stored in the user profile database 236 may be associated with a node of the node storage 252 that represents the user.

In one or more additional embodiments, the payment manager 240 can communicate with the risk calculator 238 to determine a risk associated with a consumer, a merchant, and/or a particular payment transaction. Specifically, the risk calculator 238 can determine whether the consumer/merchant is a fraudster based on information associated with the consumer/merchant in order to prevent fraudulent payment transactions. For example, the risk calculator 238 can determine the likelihood of fraudulent activity based on activity or information associated with the consumer/merchant in connection with the network application. Determining a risk associated with users involved in payment transactions can particularly be useful when processing push-to-debit transactions, when a merchant is deciding whether to issue a refund to a particular user, or when determining whether a merchant is a legitimate business. In various embodiments, the risk calculator 238 can perform one or more risk checks at any point during the payment transaction or communication process.

For example, in one or more embodiments, the network application 204 can determine whether a risk associated with the consumer/merchant or the merchant satisfies a predetermined threshold. In particular, the network application 204 can determine whether the consumer/merchant is a fraudster (e.g., a scam account or software posing as a real person) based on a "realness" score. For example, if the risk associated with the consumer/merchant is below a predetermined threshold (i.e., a high risk level), the network application 204 can determine that the consumer/merchant is likely a fraudster and notify the payment engine 206 that the consumer/merchant is a fraudster. If the consumer/merchant has a high risk level, the payment engine 206 can stop a payment transaction between the consumer and the merchant.

To illustrate, the network application 204 can determine a realness score for a user based on whether the user has been tagged has been tagged in media posted to the social networking system by one or more co-users, whether co-users of the user recognized the user's previous one or more birthdays (i.e., wished the user a "happy birthday"), the number or volume of messages exchanged between the user and co-users of the user via the network application 204, whether co-users of the user have indicated agreement or solidarity (i.e., "liked") with posts made by the user, and/or whether co-users of the user have commented on posts made by the user. Additionally or alternatively, the network application 204 can determine whether the user has been a member of a social networking system for a predetermined amount of time, lives in a pre-approved origination location, has a predetermined level of social network activity with a destination location, has a threshold realness score, etc. In another example, the network application 204 can determine a risk for a user based on the relationship between the user and a co-user, including whether the user and the co-user are friends on a social networking system, are within a number of degrees of separation, etc. Additionally, the network application 204 can use information about the payment transaction to determine whether the payment transaction is fraudulent or erroneous, such as based on the payment amount (e.g., the payment amount includes an unrealistic amount).

In additional embodiments, after determining a risk associated with the consumer/merchant, the network application 204 can perform one or more actions in association with the risk. Specifically, the network application 204 can perform an action that allows the network application 204 to verify the identity of the user. For example, the network application 204 can request information from the user that indicates the user is who the user purports to be. To illustrate, the network application 204 can request a password entry, a number of digits of a registered payment credential for the user, a personal security question, an upload of a visual identification (e.g., a photo), or other identification mechanism based on the risk level or realness score of the user.

In additional or alternative embodiments, the network application 204 can automatically perform one or more actions with respect to the payment message or a payment transaction in response to determining a risk level of the user. Specifically, the network application 204 can perform an action that affects the payment message or a corresponding payment transaction between the consumer and the merchant without requesting additional information from the user. For example, the network application 204 can allow the payment transaction, hold the payment transaction pending for review (e.g., by a bank of the user's payment credential), block the payment transaction, disable the user's account, or process the transaction without using an intermediate account (e.g., directly from the consumer's account to the merchant's account).

In any event, upon receipt of a payment message from a consumer, the payment manager 240 can detect the user (or group) ID of the consumer and retrieve the payment profile for that user (or entity). The payment manager 240 can then generate a transaction package that includes a transaction ID associated with a payment amount, the consumer, and the merchant. The transaction ID can help the system 100 track money from the consumer's account, within the system in a temporary or intermediate account, and to the merchant's account. In some instances, the system 100 can provide users access to the transaction ID to follow the movement of money during a corresponding payment transaction. Additionally, the transaction ID can also help the system 100 facilitate refunds from a merchant to a user for a previous payment transaction.

The transaction package can also include a default payment method, and related information, unless the consumer selected to send a payment to the merchant with an alternative payment method, in which case the transaction package can include payment information for the alternative payment method. The payment manager 240 may then send the transaction package to the payment network 115 to initiate the payment authorization process.

In one or more embodiments, after initiating the payment transaction and receiving a response from the payment network 115 indicating that the payment network 115 successfully processed the payment transaction, the payment manager 240 can generate and/or send a payment message to the client device 200b indicating that the payment amount was received from the user. Thus, the payment manager 240 can notify the client device 200b that the payment transaction was successful in connection with a message displayed in the client application 202 of the client device 200b. In some embodiments, the payment manager 240 can send the payment message to the client device 200b after, before, or in parallel with a message from the network application 204 to the client device 200b.

The payment manager 240 can perform various other additional steps and methods in order to effectively manage the payment process. In one or more embodiments, for example, upon receiving a payment message the payment manager 240 can generate the transaction ID and associate the transaction ID with the payment message and/or the payment information within the payment message. For instance, upon generating the transaction ID, the payment manager 240 can send the transaction ID and the payment information to the transaction database 242. The transaction database 242 can include a data table or similar data matrix that stores transaction information according to transaction ID.

The transaction database 242 of FIG. 2 can provide storage for each transaction (such as in the form of a graph object), attempted or completed, the transaction ID, a date, an amount of the transaction, the payment method used, associated messages interchanged between consumer and merchant related to the transaction, and any other information gathered on the transaction. With this information, the payment manager 240 can provide, upon request, a summary of one or more transactions to users as a history of payments requested, payments declined and payments completed.

In one or more embodiments, after a transaction ID is associated with a particular payment message, the transaction ID can be included or embedded within substantially all communications within the system relating to the particular payment. As such, the transaction ID allows the payment manager 240 to manage and process a large number of payments in an organized fashion. For example, the payment manager 240 can include instructions to include the transaction ID in any information sent to the client devices 200a, 200b. In return, the messaging handlers 210 can also include the transaction ID in any information sent from the client devices 200a, 200b to allow the payment manager 240 to efficiently and reliably identify a particular transaction to which the information corresponds, for example, when issuing refunds from a merchant to a consumer.

In one or more embodiments, the transaction ID can be associated with one or more consumer identifiers, merchant identifiers, thread identifiers (e.g., identifying a messaging thread between the consumer and the merchant), payment amounts, payment methods (e.g., consumer accounts), deposit methods (e.g., merchant accounts), transaction history, current transaction status, as well as other transaction information. In one or more embodiments, the transaction database 242 maintains the transaction information in the form of one or more graph objects that are updated with any updates or actions with respect to a transaction.

As discussed, the systems and components discussed above with reference to FIGS. 1-2 can allow a consumer to easily, effectively, and securely send payments via an integrated messaging and payment system 100 to a merchant. FIGS. 3A-3D illustrate example process diagrams of one or more example embodiments of processes implemented by system 100 discussed above. Consistent with system 100 illustrated in FIGS. 1 and 2, FIGS. 3A-3D illustrate a consumer client device 200a (associated with a user) with a client application 202, a merchant client device 200b (associated with a merchant) with a client application 202, server device(s) 108 that supports a network application 204 and a payment engine 206, and a payment network 115.

In one or more embodiments, a process for a user sending a payment to a merchant via the system 100 can begin with a merchant sending a payment request message 300. Specifically, the payment request message 300 can be a payment message indicating a payment amount for a product or service provided by the merchant. For example, the merchant can receive a message from the consumer within the messaging thread indicating a product that the consumer would like to purchase. Alternatively, the merchant can receive a selection of a product by the consumer from within a menu or product listing (e.g., a menu provided to the consumer within the client application 202). In still further embodiments, the network application 204 can comprise an advertisement (i.e., and offer to make a purchase). The network application 204 can select the advertisement based on information about the merchant or the consumer stored in the social graph 250. For example, the network application 204 can determine that the user likes coffee and is new a merchant that sells coffee. In such instances, the network application 204 can send the consumer a payment request messages that comprises an offer to purchase coffee from the merchant.

The container (i.e., contents) of the payment request message can include an identifier for the consumer, an identifier for the merchant, a payment amount, a product/service ID, a currency type, a message thread identifier, and a time stamp. As explained below, the foregoing contents of the payment request message can allow the network application 204 and/or the payment engine 206 to track and process a payment. For example, the payment engine 206 can use the merchant ID to map to (i.e., identify) a merchant account and payment credential. Similarly, the payment engine 206 can use the consumer/user ID to map to (i.e., identify) a user payment credential. In particular, when a payment is processed, the payment engine 206 can use the consumer/user ID to identify a payment credential of the consumer to charge the payment amount. The payment engine 206 can then use the merchant ID to identify an account of the merchant to apply the funds or send the funds.

The network application 206 can use the consumer and merchant IDs to track interactions between the merchant and consumers. For example, the network application 206 can track interactions and add data about the transactions to the social graph 250. In particular, the network application 206 can user the consumer and merchant IDs to associate the consumer and the merchant in the social graph 250 (i.e., add the consumer to a friend list of the merchant or vice versa). Similarly, the network application 206 can use the consumer and merchant IDs to form edges between consumers (user nodes) and a node representing the merchant.

The message thread identifier can allow the network application 204 to associate the payment request message with a particular message thread. In particular, the network application 204 can write the payment request message to the message database 234 using the message thread identifier. This can allow the merchant or the consumer to later retrieve or review the message thread.

The payment request message 300 can also include a transaction ID associated with the payment transaction. For example, the transaction ID can allow the merchant and/or the server device(s) 108 to associate the consumer, the product, the price, and merchant together to allow for tracking of the transaction. For example, as described below, the transaction ID can allow the system, the merchant, or the consumer to track the purchase, payment, and fulfillment of a purchase.

Additionally, or alternatively, the payment request message 300 may include a product ID associated with the product/service to be purchased. A product ID can allow the merchant to track inventory and fulfill the order once the purchase has been made. Furthermore, in one or more embodiments the product ID can link or otherwise provide the price for the product or service.

In one or more embodiments, the product ID can comprise a graph object ID. The graph object ID can identify a node for the product or service in the social graph 250. The network application 204 can create an edge between the merchant node and the product node to indicate that the merchant sales the product. Along related lines, the network application 204 can create an edge between the product node and the consumer/user node to indicate that the consumer has an interest in or has purchased the product.

In one or more embodiments, the payment request message 300 may only be valid for a set amount of time. In particular, the merchant may determine that the payment request message is valid for a predetermined amount of time to control prices and inventory. Thus, the payment request message 300 can include an expiration time or date, a validity time window, or other indicator of a period of validity. The network application 204 or the payment engine 206 can deny or reject a transaction if the payment request message 300 expires.

Upon receiving the payment request message 300, the network application 204 or the payment engine 206, can determine to apply discounts such as coupons, sales, or loyalty rewards associated with the user's messaging account to the payment transaction for the specified product. For example, the network application 204 can use the consumer/user ID, the merchant ID, the product ID, or other portion of the payment request message 300 to determine if a discount should be applied to the transaction. If the network application 204 determines to apply a discount, the network application 204 can add a discount code or identifier to the payment request message 300 prior to forwarding the payment request message 300 to the consumer client device 200a. Similarly, the payment engine 206 or the network application 204 can modify the payment amount included in the payment request message.

After consumer client device 200a receives the payment request message 300, the consumer can provide user input to the client application 202 to send 302 an authorization request. Specifically, the consumer can associate a payment credential with a user account for the consumer for performing a payment transaction with a merchant in the system 100. The client application 202 can cause the consumer client device 200a to send the authorization request to the payment system, as shown in FIG. 3A.

Optionally, the payment engine 206 can send 304 an authorization request against the consumer's payment credential (e.g., debit card or credit card of the consumer) for the amount of the payment or another amount (e.g., $0.01 or $100.00) to the payment network 115, which can approve or deny payment authorization. The payment network 115 can then forward 306 the payment credential authorization response to the payment engine 206. One will appreciate that the optional authorization request can take place earlier or later in the timeline. In alternative implementations, the payment engine 206 can send an authorization request against the payment credential of the consumer for the amount of the payment as part of the payment transaction request 338. The payment engine 206 can then send an authorization response 308 to the consumer client device 200a to notify the consumer client device 200 that the payment credential is authorized for the payment amount.

In one or more embodiments, the consumer client device 200a can generate a payment message 310 in response to the payment request message 300. The payment message 310 can include the same contents as the payment request message 310 and provide authorization to the charge the payment credential of the consumer. In particular, the payment message 310 can include the an identifier for the consumer, an identifier for the merchant, a payment amount, a product/service ID, a currency type, a message thread identifier, and a time stamp.

Figure 3A:
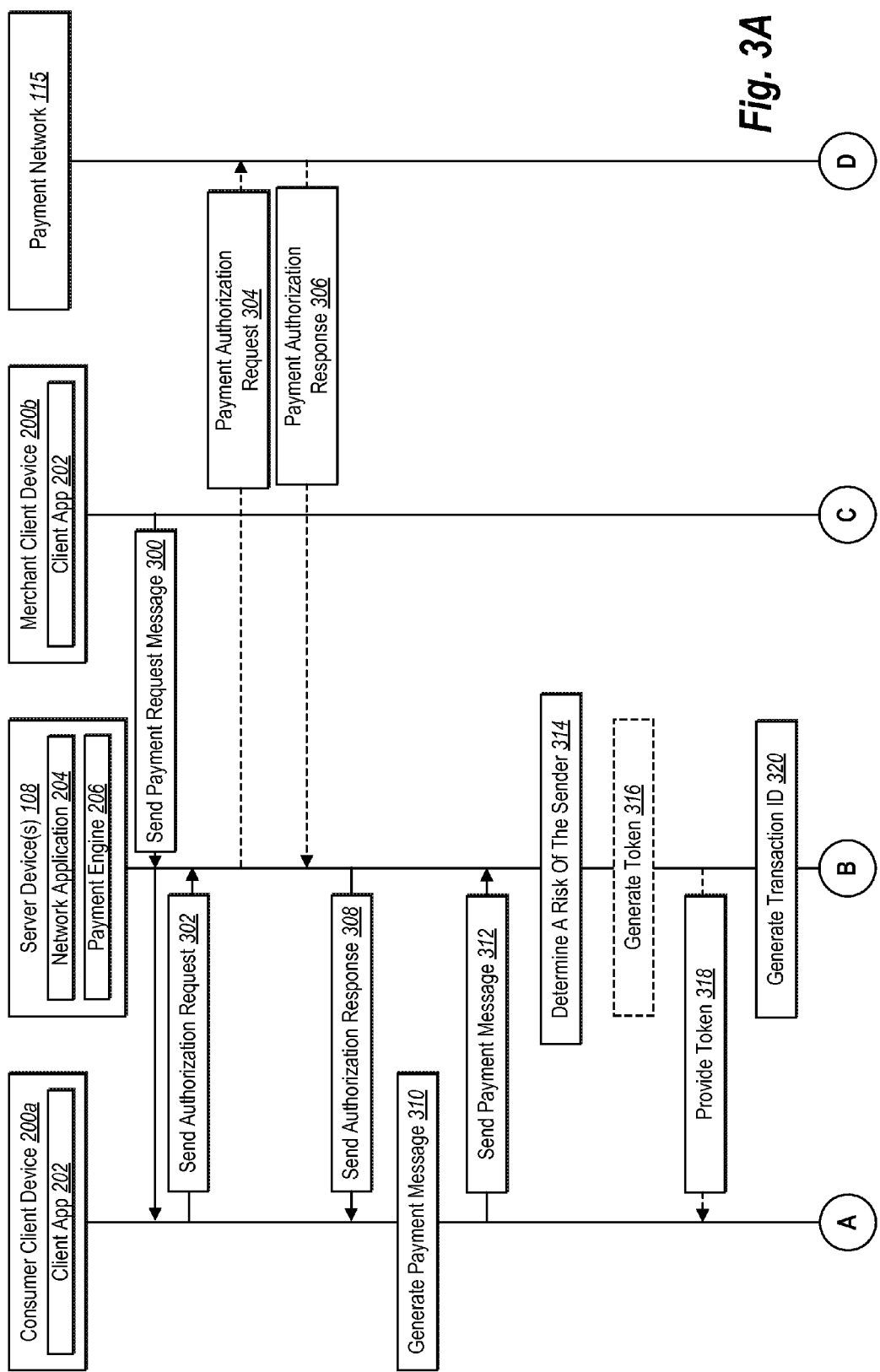
Figure 3B:
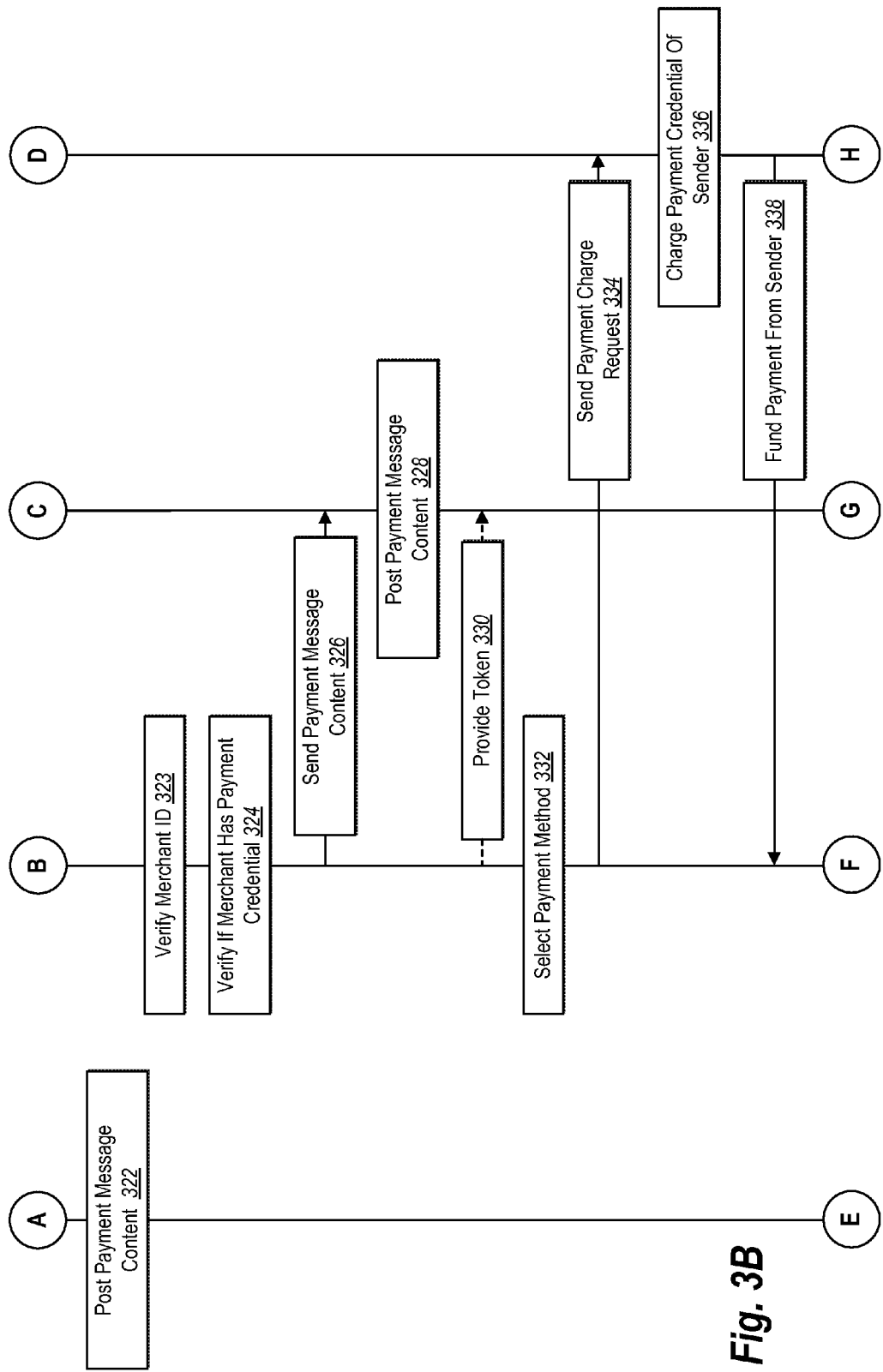

In addition, the client application 202 can cause the consumer client device 200a to send 312 the payment message to the network application 204, as shown in FIG. 3A. In one or more embodiments, the network application 204 can communicate at least some of the information from the payment message to the payment engine 206. Additionally or alternatively, the payment engine 206 can obtain information from the consumer client device 200a in connection with the payment message.

In one or more embodiments, the network application 204 can determine a risk of the consumer 314, as described above. For example, the network application 204 can use information associated with the consumer, the merchant, and/or a relationship between the consumer and the merchant to determine whether the payment engine 206 should processes a payment transaction. Specifically, the network application 204 can determine a risk associated with the consumer and notify the payment engine 206 of the risk level. The network application 204 can determine whether to process payment transactions between the consumer and the merchant. Although FIG. 3A illustrates the risk check at a particular point during the processing of a payment transaction, the risk check may occur at any time during the payment transaction before transferring the money to the merchant's account, such as while money is in an intermediate or temporary account, as described below.

Optionally, upon receiving the payment message or after determining the risk, the payment engine 206 can generate 316 a token. The token can allow the payment engine 206 to retrieve the payment credential associated with the consumer in response to subsequent payment requests. In particular, the network application 204 can return a random string called a "token" as a pointer to the stored payment credential. The token preferably has no algorithmic relationship with the payment credential, so that the payment credential cannot be derived based on the token itself (such as by merely applying a decryption algorithm to the token). Accordingly, this token is not considered cardholder data, because it is a random string from which it is not possible to extrapolate any sensitive data without the use of the payment engine 206, which contains a list of payment credentials and the tokens to which they correspond. Payment tokens generated by the payment engine 206, can allow for validation of a payment request as explained in greater detail below. The payment engine 206 can provide 318 the token to the consumer client device 200a for validating the consumer and/or payment credential in subsequent payment transactions.

Alternatively, the client application 202 can obtain, identify, or otherwise discover a user identifier for the consumer for the network application 204 and/or the payment engine 206. For example, the client application 202 can access an obfuscated (e.g., hashed, encrypted, or otherwise algorithmically transformed) user identifier of the user existing on the computing device 200a of the consumer. This user identifier can identify a user profile/account for that user of the network application 204 (e.g., a social networking application) and/or the payment engine 206. In one or more embodiments of the present disclosure, the user identifier is accessed from a portion of shared memory accessed by or reserved by the network application 204 and/or the payment engine 206, and may only exist if the user is currently "logged on" to the network application 204. In one or more other embodiments, the user identifier is accessed from a cookie (e.g., HyperText Transfer Protocol (HTTP) cookie) or from application cache (e.g., a HyperText Markup Language version 5 (HTML5) application cache) on the user's computing device 200a.

The client application 202 can send the obfuscated user identifier with the payment message 302. In one or more embodiments, one or more of the network application 204 and the payment engine 206 can then verify that the obfuscated user identifier is valid. This process may serve as the authentication for the consumer, as the existence of a proper obfuscated user identifier for the network application 204 on the user's computing device 200a indicates that the consumer has already been authenticated at the server device(s) 108. Authenticating the consumer allows the consumer to communicate with other users in connection with the network application 204 and enter payment transactions in connection with the payment engine 206.

In the event that the payment engine 206 does not validate the consumer or the payment credential, the payment engine 206 can send a communication to the consumer client device 200a to cause the client application 202 to present an error message to the consumer that indicates the payment could not be authorized. In one or more embodiments, the error message can include a prompt for the consumer to provide additional authorization information, agree to terms and conditions, or otherwise verify their identify. After which the consumer client device 200a can send a revised payment request to the payment engine 206. The network application 204 can then attempt to validate the consumer/payment credential. If the network application 204 cannot validate the consumer/payment credential, then the payment engine 206 may terminate the payment transaction based on the payment message 302.

Upon providing the token or validating the consumer/payment credential, the payment engine 206 can generate 320 a transaction ID, as illustrated in FIG. 3A. As described above, the payment engine 206 can associate a unique transaction ID to each payment message received. The payment engine 206 and the network application 204 can use the transaction ID within various files, objects, messages, and other information to allow the network application 204 to efficiently identify and process messages, status updates, and other information with respect to each payment made via the network application 204. For example, and as described above, the payment engine 206 can associate the transaction ID with a graph object that maintains information that corresponds to processing a payment message.

In response to sending the payment message 310 or in response to a signal from the network application 204 or the payment engine 206, the client application 202 can post 322 the payment message content. For example, the user interface manager 208 can add the text of the payment message to a messaging thread between the consumer and the merchant as a sent message.

Similarly, the network application 204 can send 326 the payment message content to the merchant client device 200b so that the client application 202 of the merchant client device 200b can post 328 the payment message content. For example, the user interface manager 208 can add the text of the payment message to a messaging thread between the consumer and the merchant as a received message.

Before, after, or while sending the payment message content 326 to the merchant client device 200b, the payment engine 206 can use information provided by the payment message to verify 323 a merchant ID for the particular merchant and determine 324 if the merchant has a payment credential on file (e.g., a receipt account). For example, the payment engine 206 can use the merchant identifier (e.g., username, franchise number or other ID) to lookup a user profile for the merchant in the user profile database 236 to identify the particular merchant and to determine if the user profile has a payment credential associated therewith. If the merchant has a payment credential, the payment engine 206 can validate the merchant and/or the payment credential. Alternatively, if the merchant does not have a payment credential, the payment system can request that the merchant provide a payment credential. Optionally, upon validating the payment credential, the payment engine 206 can provide 330 a token to the merchant client device 200b similar to the token for the consumer.

At this point, or before depending upon whether the merchant already had a payment credential on file, the payment engine 206 can perform a validation step to validate the merchant and/or the payment credential. For example, the client application 202 can obtain, identify, or otherwise discover a user identifier for the merchant for the network application 204 as described above in relation to validating the consumer. The client application 202 on the merchant client device 200b can send the obfuscated user identifier to the network application 204 in response to receipt of the payment message content. The network application 204 can then verify that the obfuscated user identifier is valid. This process may serve as the authentication for the merchant, as the existence of a proper obfuscated user identifier for the network application 204 on the merchant computing device 200b indicates that the merchant has already been authenticated by the network application 204.

In the event that the network application 204 does not validate the consumer or the payment credential, the network application 204 can send a communication to the merchant client device 200b to cause the client application 202 to present an error message to the merchant that indicates the payment could not be authorized. In one or more embodiments, the error message can include a prompt for the merchant to provide additional authorization information, agree to terms and conditions, or otherwise verify their identify.

The payment engine 206 can select a payment or routing method 332 for transferring the funds to a payment credential of the merchant. In one or more embodiments, the payment engine 206 can determine which payment method to use based on payment credentials available to the merchant. For example, the payment engine 206 can select a payment credential supported by the merchant. Additionally, or alternatively, the payment engine 206 can select a payment method based on a formatting of the payment message from the consumer. In other embodiments, the payment engine 206 can determine which payment method to use based on a risk associated with the consumer and/or the merchant, a cost to the payment engine 206, a cost to the consumer/merchant, a reliability of the payment method, and/or how quickly the money shows up in the merchant's account.

In some embodiments, the payment engine 206 may allow the consumer to select the type of payment method. In particular, the payment engine 206 can present a list of payment methods available to the consumer to allow the consumer to select a debit card, a credit card, a gift card, etc.

Upon detecting the selection of the payment method by the user, the payment engine 206 can issue a charge for the selected payment method and process the payment account accordingly.

In one or more embodiments, the system can separately process the funding request from the consumer's account and deposit the payment in the merchant's account. In one or more embodiments, for example, the consumer's account may be accessible on a first payment network, while the merchant's account is available on a second payment network. In such a situation, in order to process the payment, the payment engine 206 can act as an intermediary for processing the payment.

The payment engine 206 can send a payment charge request 334 to the payment network 115 that requests the payment amount be charged 336 to the consumer's payment credential and sent to the payment engine 206. In one or more embodiments, the payment engine 206 can send the payment charge request and the payment message to the merchant client device in parallel. For example, the payment engine 206 can send the payment charge request to the payment network while also sending the payment message to the merchant client device 200*b*.

In one or more additional embodiments, the payment engine 206 can format the payment charge request according to the type of payment method selected. For example, the payment engine 206 can determine that the payment method is a credit transaction based on the formatting of the payment message from the consumer client device 200*a*. The payment engine 206 can then format the payment charge request 334 to cause the payment network (e.g., by applying additional formatting or by sending information from the formatted payment message to the payment network) to transfer the funds from the consumer's payment credential. To illustrate, the formatted payment charge request can include metadata that indicates the type of payment method associated with the payment charge request.

In response to the payment charge request, the payment network 115 can fund the payment 338 from the consumer's account by electronically transferring money from the consumer's account to the payment engine 206. Upon receiving the electronic transfer, the payment engine 206 can apply 340 the payment to a temporary merchant account associated with the previously verified merchant ID. For example, the payment engine 206 can apply the payment to an intermediate account that the payment engine 206 uses to transfer funds to a payment credential of a merchant. In one or more embodiments, the payment engine 206 can create a new account to which to apply the payment. Alternatively, the payment engine 206 can apply the payment to a master temporary account that includes various other payments organized and identified by the unique transaction ID associated with each payment.

The payment engine 206 can then deposit the payment into the merchant's payment credential. In particular, the payment engine 206 can deposit the payment with a plurality of payments for other payment transactions in a settlement package for a batch transfer process. For example, in one or more embodiments, the payment engine 206 can accumulate multiple payments of the same type or within a certain time period to include within a settlement package that processes the multiple payments in a single settlement transaction. As illustrated in FIG. 3C, the payment engine 206 can first debit 341 the temporary merchant account an amount equal to all of the payments corresponding to the transaction IDs of the payment transactions in the batch transfer process. The payment engine 206 can then electronically transfer the funds to the merchant's payment credential via the payment network 115, or another payment network. In particular, the payment engine 206 can send a credit request 342 including the aggregated payment amount for the payment transactions associated with the corresponding transaction IDs from the temporary merchant account to the payment network 115 with instructions to push 344 the funds to the payment credential of the merchant.

In one or more additional or alternative embodiments, the payment engine 206 can transfer the money to the merchant's payment credential prior to receiving funds from the consumer's payment credential. In particular, the payment engine 206 can use reserve funds in an intermediate account to speed up the transfer of funds from the consumer to the merchant. In alternative embodiments, the payment engine 206 can cause the consumer's payment account to transfer money directly to the merchant's payment account, rather than transferring the money to a temporary account at the server device(s) 108.

Additionally, the system 100 may periodically perform checks to verify settlements for the time period. Specifically, the system 100 may compare payment messages stored in a messaging database to processed payment transactions for each payment network to verify that total payment amounts associated with all payment transactions processed for the period match the amounts in all payment messages. If the totals do not match, the system 100 can categorize the difference as revenue, loss, or other category based on the type of difference.

The payment network 115 can send a payment credit response 346 to the payment engine 206 upon successfully depositing the payment amounts in the settlement package into the merchant's account. To complete the payment process, before or after the payment engine 206 receives the payment credit response, the network application 204 can send a payment complete status update 348 to the consumer client device 200*a* and a payment claimed status update to the merchant client device 200*b*.

After receiving the payment complete status, the consumer client device 200*a* can optionally provide identification 350 to the merchant client device 200*b*. Specifically, the identification can allow the merchant to identify the consumer in association with an order for a specific product that the consumer picks up from the merchant. For example, the consumer client device 200*a* can send a photo identification of the consumer in a message within the messaging thread that the merchant can use to verify the identity of the consumer. Alternatively, the user can present a QR code or other identifier on the consumer client device 200*a* to the merchant to allow the merchant to verify that the consumer is associated with a particular order.

FIG. 3D illustrates an alternative embodiment in which the merchant issues a refund to the consumer. Specifically, the merchant can issue a refund to the consumer before settling with the payment network 115. For example, after applying the payment to the temporary merchant account 340, the merchant client device 200*b* can send a refund message 352 to the consumer client device 200*a*. The consumer client device 200*a* can present the refund message to the consumer in a messaging thread between the merchant and the consumer.

Before, after, or simultaneously with the refund message, the merchant client device can send a refund request 354 to the payment engine 206. In one or more embodiments, the refund request 354 can include a messaging thread identifier that allows the payment engine 206 to obtain the transaction ID 356 for the payment transaction between the consumer and the merchant. If the payment engine 206 has not already settled the temporary merchant account with the merchant's payment credential, the payment engine can debit 358 the temporary merchant account for the payment amount corresponding to the payment transaction for the identified transaction ID.

The payment engine 206 can then credit the funds back to the consumer's payment credential by sending a credit request 360 to the payment network 115. The payment network 115 can push the funds 362 to the payment credential of the consumer. In response to which, the payment network 115 can send a payment credit response 364 back to the payment engine 206 to notify the payment engine 206 that the charge was successful. The payment engine 206 can also optionally notify the consumer and the merchant that the refund was successful.

As will be described in more detail below, the components of the system 100 as described with regard to FIGS. 1-2, can provide, along and/or in combination with the other components, one or more graphical user interfaces. In particular, the components can allow a user to interact with a collection of display elements for a variety of purposes. In particular, FIGS. 4A-4K and the description that follows illustrate various example embodiments of the user interfaces and features that allow a user to send a payment to a merchant.

Figure 4D:
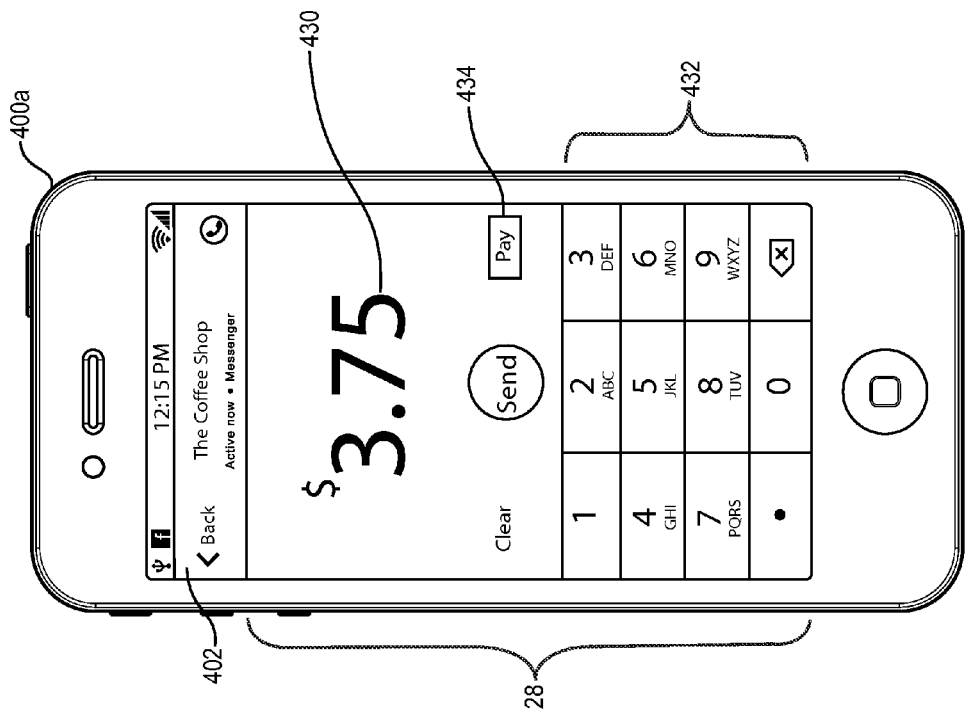

For example, FIGS. 4A-4K illustrate various views of GUIs provided by the client application 202 to facilitate electronic messaging and sending and receiving payments (e.g., in association with a social networking system). FIG. 4A illustrates a consumer client device 400a. As illustrated in FIG. 4A, the consumer client device 400a is a handheld device, such as a mobile phone device (e.g., a smartphone). As used herein, the term "handheld device" refers to a device sized and configured to be held/operated in a single hand of a user. In additional or alternative example, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

The consumer client device 400a can include any of the features and components described below in reference to the consumer client device 200a and the computing device 700 described below in reference to FIG. 7. As illustrated in FIG. 4A, the client device 400a includes a touchscreen 402 that can display or provide user interfaces and by way of which user input may be received and/or detected. As used herein, a "touchscreen display" refers to the display of a touchscreen device. In one or more embodiments, a touchscreen device may be a client device with at least one surface upon which a user may perform touch gestures (e.g., a laptop, a tablet computer, a personal digital assistant, a media player, a mobile phone). Additionally or alternatively, the client device 400a may include any other suitable input device, such as a touch pad or those described below in reference to FIG. 7.

As noted previously, the system 100 can integrate an electronic messaging system and an electronic payment system. FIG. 4A illustrates a merchant user interface 404 that the user interface manager 208 provides on the touchscreen 402. The merchant user interface 404 can provide a list 406 of merchants 408 near the location of the consumer client device 400a. In particular, the merchant user interface can show merchants 408 within a predetermined distance of the current location of the consumer client device 400a of the user. The list 406 of merchants 408 can also show the distance 410 of each merchant 408 with respect to the user's current location.

In one or more embodiments, the merchant user interface 404 can provide a list 406 of every known merchant in the predetermined distance. For example, the merchant user interface 404 can collect information for each of the merchants in a specific area and provide the information to the client device 400a. To illustrate, the merchant user interface 404 can provide a name and a location (e.g., an address) of each merchant within the predetermined distance of the user. Alternatively, the merchant user interface 404 can provide information only of merchants registered with the social networking system. In some examples, the user can opt to view all merchants in the list 406 of merchants or only merchants registered with the social networking system.

In some embodiments, the list 406 of merchants can also indicate whether each merchant is associated with a social networking system and is able to communicate with the user via the integrated message and payment system 100. For example, the network application 204 can determine whether the merchant has registered a user account with the server device(s) 108. Specifically, the network application 204 can determine whether the merchant uses a client application 202 on one or more client devices (e.g., client device 400b as described in more detail below with respect to FIGS. 4H-4K).

In one or more embodiments, the merchant can run a merchant specific version of the client application 202 on each of the client devices to interact with customers by messaging and/or accepting payments via the client application 202. As described in more detail below, the merchant specific version of the client application 202 may also have additional functions that are not available in consumer versions of the client application 202. Alternatively, the system 100 can provide the merchant with additional functionality with the client application 202 based on a merchant status associated with the merchant's account.

According to one or more embodiments, the list 406 of merchants can be a list that includes the merchants according to a predetermined order. For example, the list 406 of merchants can include the merchants based on the distance from the consumer client device's 400a current location. To illustrate, a merchant that is closest to the location of the consumer client device 400a can be in a first position of the list 406 of merchants (e.g., at the top of the list or in another most prominent position based on the structure of the list), and a merchant that is farthest from the location of the consumer client device 400a can be in a last position of the list 406 of merchants (e.g., at the bottom of the list). Alternatively, the merchant user interface 404 may display the merchants in any order within the list 406 of merchants (e.g., alphabetical order, merchant type). Additionally, or alternatively, the user can select the order in which the client application 202 displays nearby merchants.

In still further embodiments the merchant user interface 406 can include merchants that the user follows, is friends with, or that are returned via a search of merchants. For example, a user can follow or friend different merchants. Such user account of the social networking system can then store such merchants as contacts of the user.

Additionally, one or more embodiments of the merchant user interface 404 can display unique visual indicators associated with the merchants. Specifically, the list 406 of merchants can include icons 412 or logos for the merchants to allow the user to easily and quickly identify the merchants. For example, the client application 202 can obtain logos for the merchants from mapping services, online services for the merchants, or based on input from the merchants in association with corresponding user accounts with the system 100.

From the list 406 of merchants in the merchant user interface 404, the user can view more information about the merchants. Specifically, the user can select a particular merchant in the list 406 of merchants to access additional information about the particular merchant. For example, the user can select the merchant to view business hours, view contact information, an address, a location on a map, a brief description of the merchant, images of products, reviews or links to reviews, a menu or menu link, merchant ratings, or other information about the merchant. In one or more implementations, the merchants can control the type, amount, or content of information available for viewing via the client application 202.

As mentioned, the user can view contact information associated with the merchant. In one or more embodiments, the user can view contact information about the merchant in connection with the system 100. In particular, the user can "like" a page or account of the merchant or select to add the merchant to a list of contacts for the user in connection with the integrated message and payment system 100. For example, the list of contacts can provide a list people or entities with which the user is connected or associated within the system 100, and with which the user is able to communicate via the client application 202.

According to one or more embodiments, the user can add the merchant to the user's list of contacts by selecting an option to add the merchant to the user's list of contacts. Additionally, or alternatively, the client application 202 can automatically add the merchant to the user's list of contacts in response to a selection by the user to communicate with the merchant (e.g., call or send a message to the merchant). In one or more additional or alternative embodiments, the client application 202 can automatically add the merchant to the user's list of contacts if the user has previously entered into a payment transaction with the merchant via the client application 202 or in response to another aspect of the user's activity history within the client application 202.

In one or more embodiments, the user can view whether the merchant allows users to communicate with the merchant within the client application 202 from the list of contacts or from a merchant page. Specifically, the user can determine whether the merchant has a user account with the system 100 that allows the merchant to communicate with users via the client application 202. For example, the user can identify merchants in the list that are registered with the social networking system. To illustrate, the list 406 of merchants can include an identifier that indicates whether a particular merchant has a user account with the social networking system, if the merchant has the client application 202 installed and operating on one or more client devices, and/or if the merchant is able to receive payments via the client application 202. Additionally, or alternatively, the list 406 of merchants can include an indication of whether the merchant is active (e.g., logged into the client application 202, connected to the Internet, recently performed an action using the client application 202) or otherwise available for messaging via the client application 202.

If a particular merchant is available for messaging via the client application 202, the user can select an option to initiate a messaging conversation with the merchant. In particular, the user can select the option to initiate the messaging conversation from within the list 406 of merchants or from a merchant page within the client application 202. Additionally, or alternatively, the merchant can initiate a messaging conversation with the user from within the client application 202.

According to one or more embodiments, the system 100 can allow the merchant to view information about the user (e.g., whether the user is on a mobile device or active in the client application 202) and/or add the user to a list of contacts (e.g., a list of current or future customers) based on user preferences or privacy settings. For example, the system 100 can allow the merchant to add the user to list of contacts for the merchant in response to determining that the user has selected a preference explicitly allowing merchants to add the user to the list of contacts for the merchant. To illustrate, the user can select a preference that allows merchants to add the user to a list of contacts and/or communicate with the user without requiring the merchant to request additional permission from the user (e.g., request permission to contact the user during a payment transaction with the user).

Additionally, or alternatively, the user preference can allow merchants to interact with the user based on the user's location. Specifically, the user preference can allow the merchants to interact with the user if the user is proximate the merchant's location. For example, when the user enters a predefined proximity near the merchant's location, the system 100 can notify the merchant's client device 400b (shown in FIGS. 4H-4J) that the user is proximate the merchant, allowing the merchant to know the user's location and to interact with the user.

For example, the system 100 can identify a location of the user's client device 200a based on location information that the client device 200a provides to the system 100 on a continuous or intermittent basis in connection with a location-based service. The system 100 can compare the location of the client device 200a with respect to a geo-fence of the merchant (i.e., a virtual perimeter that the system 100 has established for the merchant). When the client device 200a enters the geo-fence, the system 100 can determine that the client device 200a is proximate the location of the merchant and notify the merchant.

After receiving the notification that the user is proximate the merchant, the merchant can interact with the user by adding the user to a list of contacts for the merchant or contacting the user. For example, the merchant can automatically add the user to the list of contacts and/or send the user a message via the messaging application 202. To illustrate, when the merchant identifies that the user is proximate the merchant's location, and the user preferences allow the merchant to interact with the user, the merchant can add the user to the merchant's list of contacts. Additionally, or alternatively, when the merchant receives a notification that the user is proximate the merchant's location, the merchant can initiate a messaging thread with the user via the client application 202 whether the user is a new customer or a returning customer. For example, the merchant can send a message to the user to welcome the user and/or to send the user a product listing, information about sales or specials, or other information that the user may find interesting.

As described above, the system 100 can facilitate receiving and sending data. In one or more embodiments, the communication manager 230 facilitates receiving and sending electronic communications between the computing devices 400a, 400b. Also, in one or more embodiments, the user interface manager 208 displays electronic communications sent and received via the communication manager 230. In one or more embodiments, the user interface manager 208 can display electronic communications sent and received via the communication manager 230 in a messaging thread within the messaging graphical user interface. Initiating a messaging conversation with the merchant allows the user and merchant to exchange messages within a messaging thread. For example, initiating the messaging conversation can open a messaging graphical user interface at the client device 400a, as illustrated in FIG. 4B. The messaging graphical user interface can present a messaging thread between the user and the merchant. For example, in the embodiment of FIG. 4B, the messaging graphical user interface includes a conversation in a messaging thread between a consumer user ("Brad") and a merchant ("The Coffee Shop").

Given the flexible nature of the client application 202, the user can communicate with the merchant (e.g., an employee of the merchant) about a variety of topics. Specifically, the user can request information from the merchant that allows the user to determine a product to purchase and how to purchase the product. Additionally, or alternatively, the user can communicate with the merchant about one or more products provided by the merchant; a past, present, or future payment transaction; sales or discounts; business hours; or any other information that the merchant can provide to the user. In still further embodiments the merchant can provide response to common questions (e.g., are you open, what are your hours, what is your address) to the network application 204. The message analyzer can recognize common questions and automatically respond with a predefined response (e.g., our business hours are 9 am to 9 pm).

Because the client application 202 allows a user to converse with a person associated with the merchant, the user can communicate with the merchant with natural language. Communicating with the merchant with natural language may allow the user to more easily and more clearly obtain relevant information without having to call the merchant or obtain the relevant information in person. In some instances, the client application 202 may allow the merchant to use software that is able to converse with users by parsing and understanding natural language to automatically respond to questions or requests made by a user within the messaging thread.

As shown, the messaging graphical user interface 414 can include a messaging thread 416 that includes electronic messages 418a sent from an account of a user of the client device 400a. Similarly, the messaging thread 416 can include electronic messages 418b received by the account of the merchant. In one or more embodiments, the user interface manager 208 organizes the messaging thread 416 such that new messages are added to the bottom of the messaging thread 416 so that older messages are displayed at the top of the messaging thread 416. In alternative embodiments, the user interface manager 208 may organize the messages 418a, 418b in any manner that may indicate to a user the chronological or other relationship between the messages 418a, 418b.

The user interface manager 208 provides a variety of electronic communication characteristics to help a user distinguish between electronic communications in the messaging thread 416. For example, as illustrated in FIG. 4B, the user interface manager 208 displays the electronic messages 418a sent from an account of the user of the client device 400a pointed toward one side (i.e., the right side) of the messaging graphical user interface 414. On the other hand, the user interface manager 208 displays the electronic messages 418b received by the messaging handler 212 pointed toward the opposite side (i.e., the left side) of the messaging graphical user interface 414. In one or more embodiments, the positioning and orientation of the electronic messages 418a, 418b provides a clear indicator to a user of the client device 400a of the origin of the various electronic communications displayed within the messaging graphical user interface 414.

Another characteristic provided by the user interface manager 208 that helps a user distinguish electronic communications may be a color of the electronic communications. For example, as shown in FIG. 4B, the user interface manager 208 displays sent electronic messages 418a in a first color and received electronic messages 418b in a second color. In one or more embodiments, the first and second colors may be black and white, respectively, with an inverted typeface color. In an alternative embodiment, the user interface manager 208 may display the electronic messages 418a, 418b with white backgrounds and different colored outlines.

In yet another alternative embodiment, the user interface manager 208 may display the electronic messages 418a, 418b with backgrounds of different patterns, in different fonts, in different sizes or in any other manner that may distinguish the sent electronic messages 418a from the received electronic messages 418b. For example, in one or more embodiments, the user interface manager 208 displays sent electronic messages 418a with white typeface on a blue background. Likewise, in one or more embodiments, the user interface manager 208 displays received electronic messages 418b with black typeface on a grey background.

The user interface manager 208 may also provide a message input control palette or toolbar 422. As illustrated in FIG. 4B, the user interface manager 208 displays the message input control palette or toolbar 422 as part of the messaging graphical user interface 414. In one or more embodiments, the message input control palette or tool bar 422 includes a variety of selectable message input controls that provide a user with various message input options or other options. For example, in FIG. 4B, the message input control palette or toolbar 422 includes a text input control 424a, a payment control 424b, a camera viewfinder input control 424c, a multimedia input control 424d, a symbol input control 424e, and a like indicator control 424f. In one or more alternative embodiments, the message input control palette or toolbar 422 may provide the input controls 424a-424e in a different order, may provide other input controls not displayed in FIG. 4B, or may omit one or more of the input controls 424a-424e shown in FIG. 4B.

As will be described below in greater detail, a user may interact with any of the input controls 424a-424e in order to compose and send different types of electronic communications. For example, if a user interacts with the text input control 424a, the user interface manager 208 may provide a touchscreen display keyboard 418 in a portion of the messaging graphical user interface 414 that the user may utilize to compose a textual message 420. Similarly, if a user interacts with the multimedia input control 424d, the user interface manager 208 may provide a multimedia content item display area (e.g., for displaying digital photographs, digital videos, etc.) within a portion of the messaging graphical user interface 414. Likewise, if a user interacts with the camera viewfinder input control 424c, the user interface manager 208 may provide a digital camera interface within a portion of the messaging graphical user interface 414 that the user may utilize to capture, send, and add a digital photograph or digital video to the messaging thread 416.

Figure 4C:
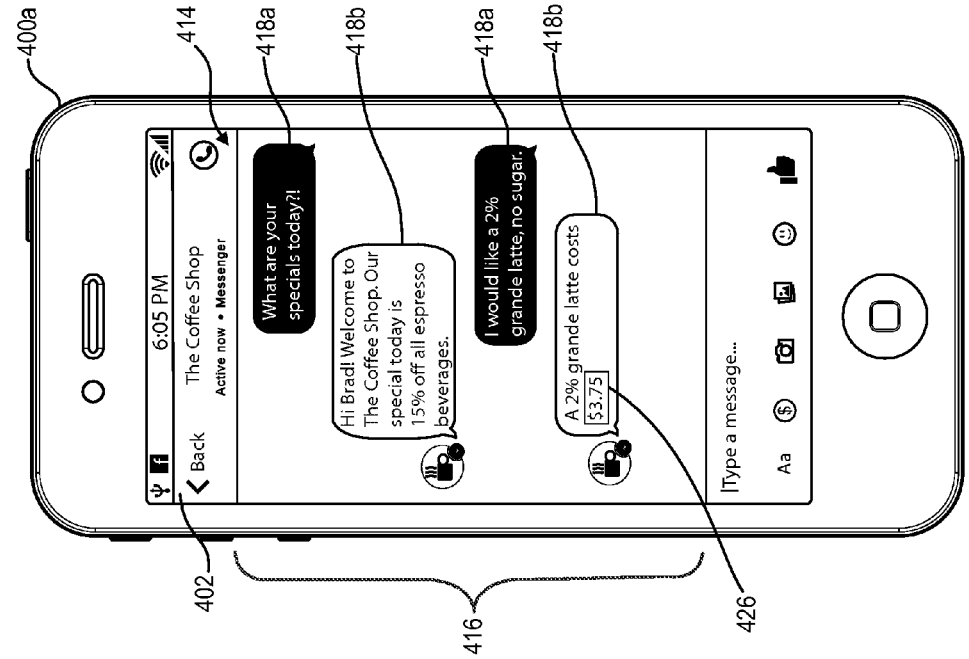

A user may interact with any of the message input controls 424a-e in order to compose and send a message or a payment to the merchant via the system 100. For example, as shown in FIG. 4C, the user sends a message to the merchant in the messaging thread that says, "I would like a 2% grande latte, no sugar." In response to the message or another user input (e.g., selecting a product from a menu or catalog), the merchant can send a payment request message 300 to the consumer. For example, FIG. 4C illustrates a payment request message that states, "A 2% grande latte costs $3.75." As shown, the payment request message does not surface (i.e., display) all of the contents of the payment request container as described above in relation to FIG. 3A. As shown, the payment request message shown in FIG. 4C can display the payment amount (i.e., $3.75) and an identification of the product being purchased (i.e., a 2% grande latte).

In one or more embodiments, the user interface manager 206 can convert the "$3.75" into a payment initiation selectable element 426. In another example, the user interface manager 206 can convert the entire message into a payment initiation selectable element 426. In an additional example, the user interface manager 206 can provide a notification (e.g., a pop-up window or other onscreen element) to ask the consumer if the consumer would like to initiate a payment transaction with the merchant based on the payment request message.

The user interface manager 206 can also modify/change one or more attributes or characteristics of the message or a portion thereof to indicate the creation of the payment initiation selectable element 426. For example, the user interface manager 206 can highlight the "$3.75" as shown in FIG. 4C. Alternatively, the user interface manager 206 can underline, change the font style, size, color etc., or otherwise visually distinguish the payment initiation selectable element 426.

Upon the user input detector 210 detecting a tap touch gesture on the payment control 424b or the payment initiation selectable element 426, the user interface manager 208 may display a payment user interface 428 within the messaging user interface 414 as shown in FIG. 4D. In particular, the payment interface 428 can include a numerical keypad 432 that can allow a user to select a payment amount 430 by entering the desired digits in sequence (i.e., by tapping "3", ".", "7", and then "5" within the numerical keypad 432 in sequence to arrive at $3.75). The payment interface can display the selected digits to allow the user to verify that the selected digits correspond to the desired payment amount and to modify the selected digits accordingly. One will appreciate in light of the disclosure herein that the payment interface 428 of FIG. 4D is one implementation of a payment interface. In one or more embodiments, a user can select a payment interface 428 from a plurality of different payment interfaces. Alternatively, the user interface manager 208 can automatically populate the payment interface 428 with the payment amount from the payment request message.

In alternative embodiments, the user interface manager 208 can provide the messaging thread 416 in a first portion (i.e., the upper portion) of the messaging user interface 414. The user interface manager 208 can provide the payment user interface 428 in a second portion (i.e., the lower portion) of the messaging user interface 414. Thus, the user interface manager 208 can allow the user to view the messaging thread 416 and any new messages, while also being able to initiate a payment transaction. In alternative embodiments the user interface manager 102 can arrange the messaging thread 416 and the payment user interface 428 horizontally or in another arrangement other than a vertical arrangement. In still further embodiments, the payment user interface 428 can comprise an overlay over the messaging user interface 414 or a separate user interface.

In one or more embodiments, when the user selects a pay element 434, the consumer client device 400a can generate a payment message. As mentioned above in relation to FIG. 3A, the payment message can include the same contents as the payment request message. Before sending the payment message, the client application 202 can send a request to the network application 204 to determine if the consumer has a registered payment credential accepted by the merchant. In the event the consumer is not associated with a registered payment account that is accepted by the merchant, a user interface manager 208 can present a credential user interface 436 that allows the consumer to register a payment credential, as shown in FIG. 4E. Alternatively, or additionally, a graphical interface can present a one-time payment option that allows a user to input payment information to facilitate a one-time payment (e.g., enter a debit card or credit card number), without requiring the consumer to create an account.

One will appreciate that the credential user interface 436 can vary depending upon which type of payment credential the user selects to enter. In or more embodiments, the user interface manager 208 can provide a list of acceptable payment credentials (e.g., credit card, debit card, gift card, bank account) for sending funds to a merchant. Upon a user selecting a type of payment credential, the user interface manager 208 can provide an applicable credential user interface 436. For example, FIG. 4E illustrates a credential user interface 436 for entering a debit card. As shown, a user can input, via a numerical keypad 432, a debit card number, an expiration date, a security code, and a billing ZIP code associated with the debit card. Upon selecting entering the payment information, the messaging handler 212 can send the payment credential information to the network application 206 for storing a payment credential.

After the user has entered the payment credentials details, the system 100 can continue processing the payment transaction. In one or more embodiments, the client application 202 can provide to the user an option to use a PIN or other shortcut for processing future payment transactions. For example, the client application 202 can present to the user a pop-up window 438 or other notification in the messaging interface 414 asking the user whether the user wants to create a PIN for sending money for added security, as shown in FIG. 4F.

Figure 4G:
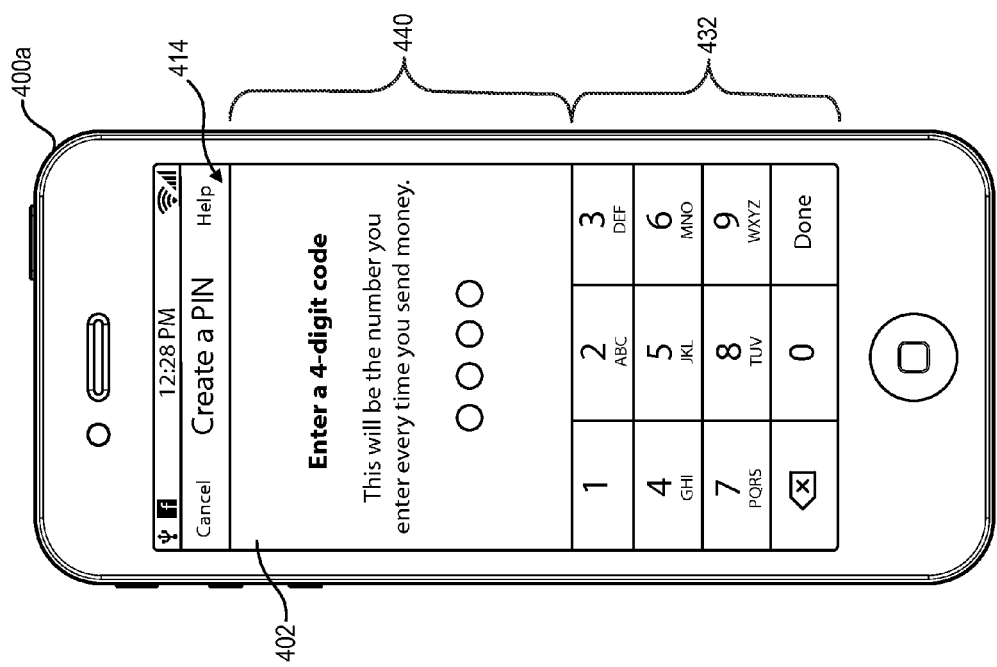

If the consumer selects to enter a PIN for processing future payment transactions, the client application 202 can present a PIN creation interface 440 for creating a PIN, as shown in FIG. 4G. Specifically, the PIN creation interface can allow the consumer to create a unique PIN associated with the consumer's stored credentials. For example, the PIN can be a 4-digit number (or string of any length) that the consumer is can input via the numerical keypad 432 before being able to process a future payment transactions. In some instances, the system 100 can also request that the consumer confirm the PIN by re-entering the PIN in order to create the PIN and associate the PIN with the stored credentials.

For future payment transactions, the system 100 can present a PIN input interface by which the consumer can input the PIN. Inputting the PIN can allow the system 100 to process the payment transaction using the credentials stored for the user in association with the PIN. Thus, entering the PIN will allow the consumer to initiate and complete payment transactions without remembering the credentials every time the consumer wishes to send money to another user via the system 100.

In one or more embodiments, while validating or after validating the payment credentials of the user, the consumer client device 400a can send the payment message to the merchant client device. The system 100 can present the payment amount 430 within the messaging thread 416 for both the user and the merchant involved in the conversation. For example, the system can insert the payment amount 430 for the payment message in a messaging thread 416 of a graphical user interface for the client device 400a.

Figure 4H:
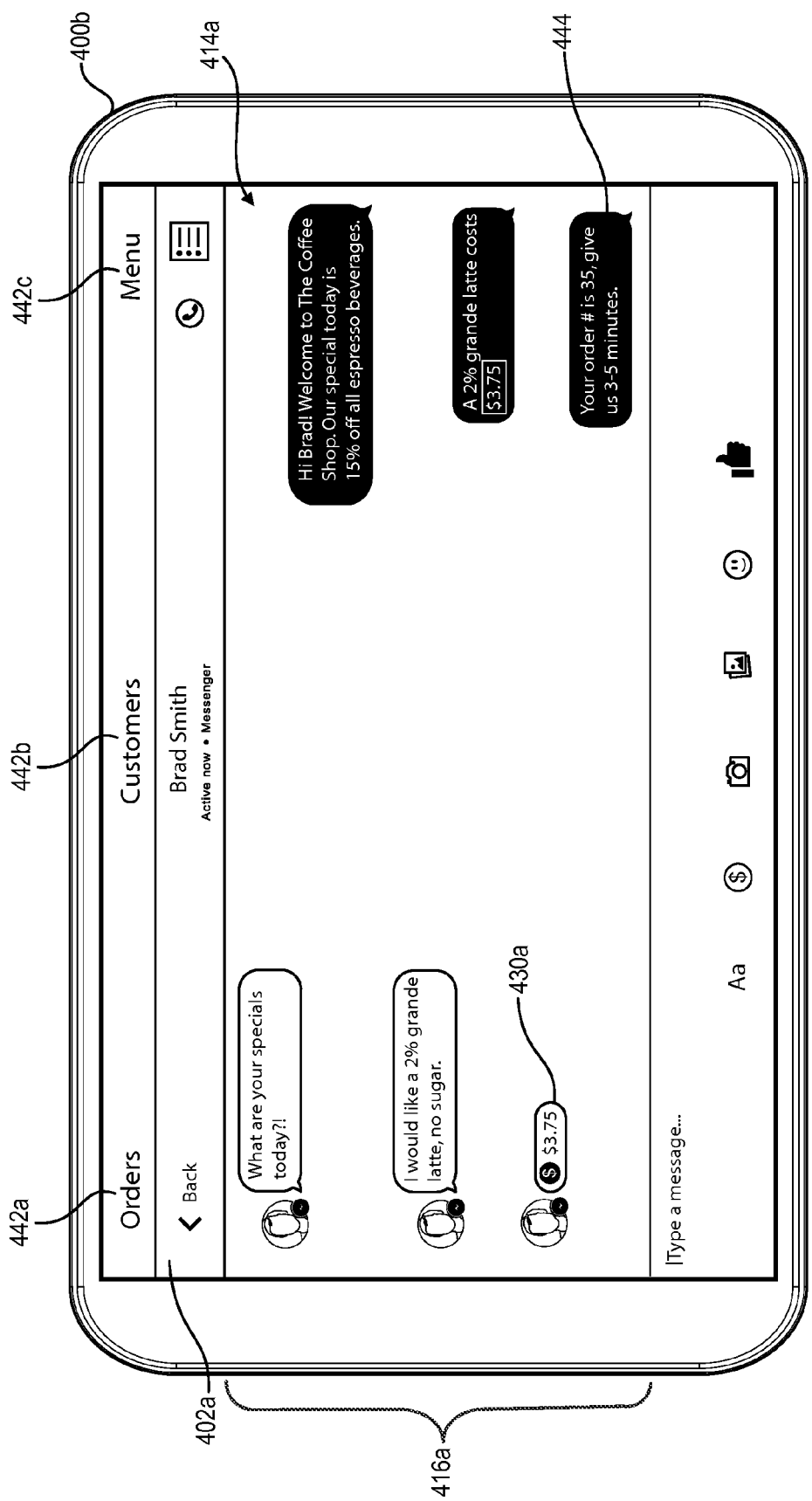
Figure 4I:
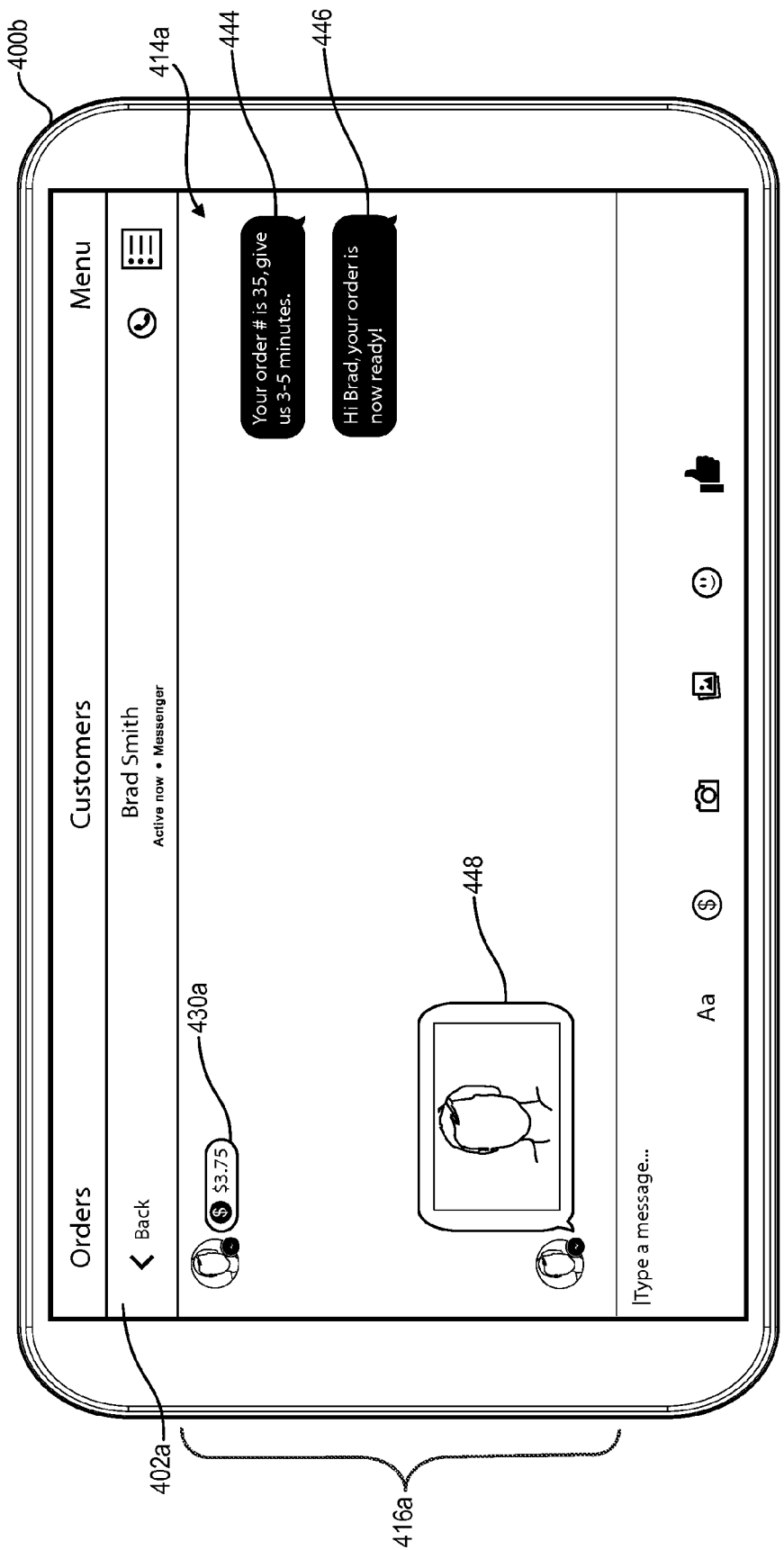
Figure 4J:
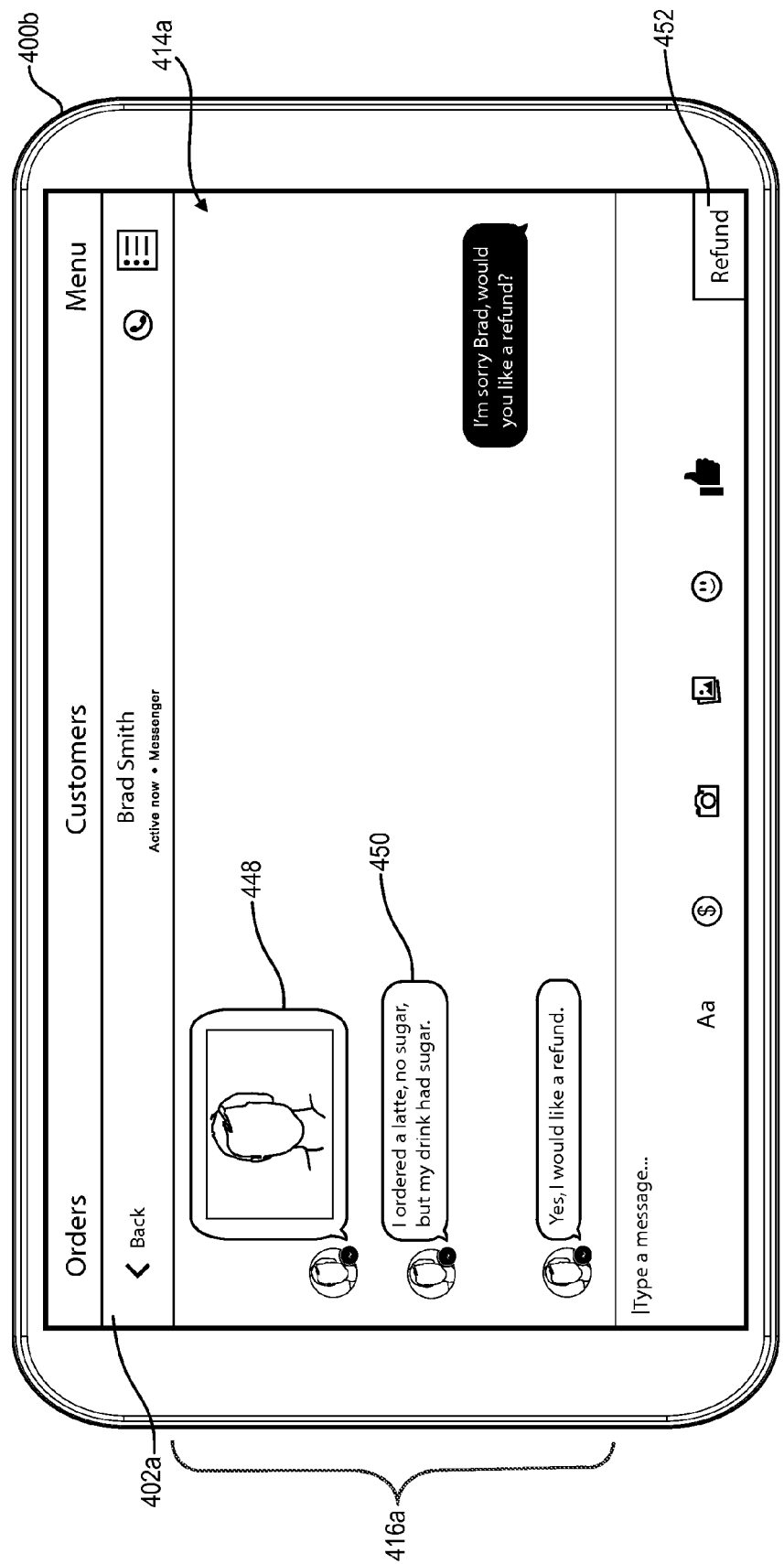

FIGS. 4H-4J illustrate embodiments of a messaging interface 414a for the merchant client device 400b. For example, FIG. 4H illustrates the messaging interface 414a at the merchant client device 400b after the user has initiated the payment transaction to send a payment amount to the merchant. The merchant client device 400b illustrated in FIG. 4H can include any device with a touchscreen 402a, such as a display device mounted to a stand or other device at the merchant's location. The messaging interface 414a at the merchant client device 400b can allow the merchant to exchange messages with the user within the messaging thread 416a.

According to additional embodiments, the merchant version of the client application 202 can also allow the merchant to view additional information associated with the merchant. For example, the merchant version of the client application 202 can include controls 442a-442c that allow the merchant to perform operations or to access information not available to consumers. To illustrate, the merchant version of the client application 202 can include an orders control 442a, a customers control 442b, and a menu control 442c.

For instance, the orders control 442a can allow the merchant to view pending and/or recent orders. The customers control 442b can allow the merchant to view a list of previous customers who have interacted with the merchant via the client application 202 (e.g., in the list of contacts for the merchant). The menu control 442c can allow the merchant to view the menu (or other product listing) of the merchant, for example, to allow the merchant to provide menu or product information to a customer while exchanging messages with the customer in the client application 202. In additional or alternative embodiments, the merchant version of the client application 202 can include more, fewer, or different merchant-specific controls than illustrated in FIGS. 4H-4J.

As mentioned, the system 100 can notify the merchant that the consumer has initiated the payment transaction, for example, by showing the payment amount in the messaging thread 416a of the messaging interface 414a associated with the consumer's identity, and text content (e.g., "Sent from Messenger") in a message with the payment amount 430a. To illustrate, the user interface manager 208 can insert the payment amount 430a into a time-dependent flow of a messaging thread 416a with other messages exchanged between the consumer and the merchant. Additionally or alternatively, the user interface manager 208 can present the payment amount 430a in another manner (e.g., by providing a notification in a notification area of the merchant's client device 400b or in an overlay of the messaging interface 414a). The user interface manager 208 can also present the payment amount within the messaging thread 416 of the messaging interface 414 at the user's client device 400a.

In one or more embodiments, the user interface manager 208 can provide a confirmation request to the merchant to allow the merchant to accept the payment transaction for the indicated amount (i.e., by selecting an element in the messaging interface such as an accept element 452). After the merchant accepts the payment transaction, the system 100 can complete the payment transaction and begin the process of transferring funds from the user to the merchant. In an alternative example, the payment message can merely bring attention of the payment transaction to the merchant while the system 100 automatically processes and completes the payment transaction.

According to one or more embodiments, the merchant can modify the payment amount 430a from the user. Specifically, if the merchant determines that the user paid the wrong amount in the payment transaction (e.g., too high or too low), or if the merchant wants to adjust the price for any other reason (e.g., for customer loyalty, coupons or discount programs), the merchant can adjust the payment amount 430a. For example, the merchant can select the payment amount 430a in the message to open a payment interface at the merchant client device 400b. After opening the payment interface, the merchant can select a new payment amount and send a modified payment message to the user, who can then approve or deny the new payment amount. The user and merchant can also exchange additional messages about the new payment amount.

In one or more embodiments, when the merchant selects to accept the payment or after the merchant receives the payment message, the client application 202 can send a request to the network application 204 to identify a registered payment credential for the merchant. After identifying the merchant's payment credential, the system 100 can complete the payment transaction. Specifically, the system 100 can complete the payment transaction by transferring funds from the user to the merchant. In some instances, transferring funds from the user to the merchant can include transferring funds into a temporary or intermediate account associated with the merchant until the corresponding financial institutions approve the transaction. In alternative instances, completing the payment transaction can include directly transferring the funds into the destination account associated with the merchant.

After completing the payment transaction (or after the merchant selects to complete the payment transaction), the system 100 can display a payment completion message to the user and/or the merchant. In one or more embodiments, after closing the payment completion message or otherwise completing the payment transaction, the system 100 can update the payment amount 430 (and any other text of the corresponding message) in the messaging thread 416 on the client device 400a and/or the messaging thread 416a of the merchant client device 400b to reflect that the system 100 has completed processing the payment transaction. For example, the user interface manager 208 can change certain characteristics of the message (which in this case comprises only the payment amount 430) in the messaging thread 416a. To illustrate, the user interface manager 208 can animate the message, change the position of the message, the border width of the message, the background color of the message, the size and font of the message, or any other characteristic of the message suitable for this purpose.

As shown in FIG. 4H, the system 100 can allow the merchant to communicate additional information to the user within the messaging thread. For example, the merchant can send a message containing information associated with the completed payment transaction. To illustrate, the merchant can send an order message 444 that includes an order number for the purchased product (e.g., the latte) to allow the user to be able to pick up the purchased product when the order is ready. Additionally, or alternatively, the order message 444 can communicate additional, or alternative, information based on the merchant, product, or other details associated with the payment transaction. For example, the order message 444 can include an estimated wait time for the merchant to complete the order (e.g., "Give us 3-5 minutes," as shown in FIG. 4H), a tracking number associated with shipping information, a date of purchase, a return merchandise authorization number, an invoice number, receipt information (e.g., information typically included on a paper receipt), a customer representative, or other information that may be useful for the user to know in relation to the payment transaction.

After sending the order message, the merchant can send an order completion message 446, as illustrated in FIG. 4I. Specifically, the merchant can notify the user that the user's order is ready for the corresponding order number in the order completion message 446. For example, the order completion message 446 can identify the user by name and include text indicating that the order is ready for the user to pick up from the merchant.

In one or more embodiments, the user can provide verification information to the merchant to allow the merchant to identify the user when the user picks up the order. For example, the user can provide photo identification 448 (e.g., an image of the user or legal form of photo identification) of the user to the merchant via the client application 202 that the merchant can view to verify the user's identity. To illustrate, user can provide the photo identification 448 as an attachment in a message of the messaging thread to the merchant. For example, after ordering a product and completing a payment transaction, the user can send a message with the user's photo attached to the message, and the merchant can compare the user to the user's photo when the user attempts to pick up the order. Alternatively, when the user sends a message to the merchant, the messaging thread may display the user's photo as an icon next to the user's name, and the merchant can select the icon to view a larger version of the user's photo.

In some embodiments, the system 100 can use image recognition techniques to verify the photo identification 448 of the user to prevent fraudulent identification. Specifically, the system 100 can compare the photo of the user to stored information (e.g., in a messaging database) associated with the user to verify that the photo identification 448 is a photo of the user. To illustrate, the system 100 can use image recognition techniques to compare other photos of the user to the photo identification 448 provided to the merchant to verify the user's visual identification. After verifying the identification of the user, the merchant can deliver the order to the user to complete the transaction.

In alternative embodiments, the order completion message 446 that the merchant sends to the user can include information that the user can present to the merchant to pick up the order. In particular, the order completion message 446 can include a code that the user can present to the merchant so that the merchant can verify that the user ordered the product. For example, the order completion message 446 can include a QR code that the user can scan at a pick up counter to retrieve the ordered product (e.g., the latte) from the merchant.

After completing the payment transaction, the system 100 can allow the user to obtain a refund from the merchant within the client application 202. Specifically, the system 100 can allow the user to request a refund from the merchant within the messaging thread. For example, the user can exchange one or more messages with the merchant to request a refund from the merchant within the messaging thread, as shown in FIG. 4J. To illustrate, the user can send a refund request message 450 (e.g., indicating an error with the user's order or a defect of the product) to the merchant in association with the payment transaction and/or the payment message in the messaging user interface at the client device 400a.

As mentioned previously, the merchant client device 400b may include a version of the client application 202 that includes functionality specific to merchants. In particular, after receiving the refund request message 450 from the user, the merchant can opt to issue a refund to the user. For example, the messaging user interface 414a can include a refund element 452 that allows the merchant to issue a refund associated with the payment transaction with the user. To illustrate, the merchant can select the refund element 452 to initiate a refund process for the payment transaction to transfer the payment amount to the user.

In alternative embodiments, the user interface manager 208 can provide a refund request element (not shown) associated with the payment transaction within the messaging thread 416 at the client device 400a of the user. Selecting the refund request element can cause the client device 400a to send a refund request message 450 to the merchant. When the merchant client device 400b receives the refund request message 450, the user interface manager 208 can provide the refund request message 450 in the messaging thread 416a of the messaging user interface 414a. For example, the user interface manager 208 can format the refund request message 450 to include a refund selectable element within the messaging thread 416a.

Additionally, the refund request message 450 can include additional information associated with the corresponding payment transaction. Specifically, the refund request message 450 can include information that allows the merchant to understand the refund request and identify the transaction. For example, the refund request message 450 can include text that describes the refund request (e.g., "Brad requested a refund for order #35") and/or a reason for the refund (e.g., "I ordered a latte, no sugar, but my drink had sugar."). Based on the refund request message 450 and the additional information, the merchant can make a determination of whether to refund the money to the user.

In one or more embodiments, the merchant can determine whether and/or how much to refund based on information associated with the user. Specifically, the merchant can use information about the user in connection with the system 100 to determine whether to give the user a refund. For example, the merchant can access a user rating for the user based co-user feedback or merchant feedback for the user in connection with the system 100. To illustrate, the user rating can be based on risk information associated with the user (as described previously) to determine whether the user frequently requests refunds from merchants. Alternatively, the merchant can use ratings from third-party systems to determine whether and/or how much of a refund to issue to a particular user. Similarly, the merchant can use the user ratings or other information associated with the users to determine any modifications to pricing or deals associated with the initial payment transaction to purchase a product.

Figure 4K:
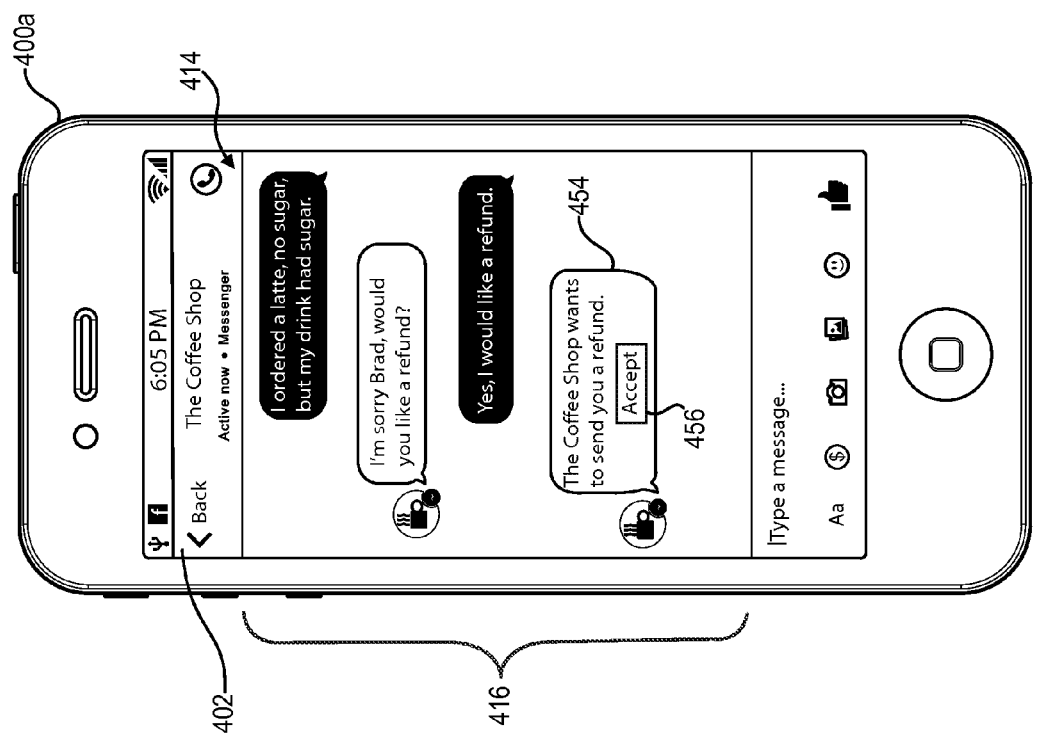

When the merchant initiates the refund process to refund the payment amount to the user, the merchant can send a refund message to the user indicating that the merchant initiated the refund process. In particular, initiating the refund process can cause the merchant client device to 400a to send a refund message 454 to the client device 400a to display within the messaging thread, as shown in FIG. 4K. In one or more embodiments, the refund message 454 notifies the user that the merchant issued the refund and that the payment amount will be available to the user in the user's account within a certain amount of time. In alternative embodiments, the refund message 454 can notify the user that the merchant wants to issue a refund to the user, and also request that the user accept or approve the refund.

Additionally, or alternatively, the refund message 454 can include other information that may be helpful to the user. For example, the refund message 454 can include information that allows the user to identify the product and the specific payment transaction for the user's records or for verifying that the refund issued properly. To illustrate, the refund message 454 can include a payment amount, an order number, a reason for the refund, and/or other information that allows the user to identify the payment transaction.

In one or more embodiments, the user interface manager 208 can also provide a confirmation request to the user to allow the user to accept the refund from the merchant for the payment transaction (i.e., by selecting an element in the messaging interface such as an accept element 456). In some examples, the refund message 454 can include the accept element 456 or the user interface manager 208 can display the accept element 456 in an overlay or notification area. After the user accepts the refund, the system 100 can begin the process of transferring funds for the payment amount from the merchant to the user. In an alternative example, the refund message 454 can merely bring attention of the refund to the user while the system 100 automatically processes and completes the refund.

As described previously, the system 100 can maintain a transaction ID for each payment transaction between a user and a merchant. Additionally, the system 100 can associate the transaction ID with the consumer, merchant, and/or messaging thread. By associating the transaction ID with the consumer, merchant, and/or messaging thread, the system 100 can allow a merchant to easily refund a payment associated with a previous transaction. Specifically, when the consumer of the payment sends a refund request, the refund request can include a transaction ID embedded in the refund request to allow the system 100 to easily identify all of the relevant information needed to refund money to the user from within the client application 202. To illustrate, when the merchant selects a refund element 452, the system 100 can identify the corresponding transaction ID, in addition to the consumer, merchant, corresponding accounts, and payment amount. Thus, when the merchant selects the refund element 452, the system 100 can automatically process the refund to the user without requiring the merchant to take additional steps with other devices or via other applications.

In one or more embodiments, when the merchant selects the refund element 452 or otherwise initiates a refund process for a payment transaction (e.g., after sending the refund message to the user and after the user accepts the refund), the system 100 can detect the initiation of the refund process and communicate with the payment network 115. In particular, the system 100 can send a request to the payment network 115 to transfer funds equal to the payment amount of the payment transaction from the merchant's account based on the transaction ID. In some examples, the payment network 115 can transfer the funds to a temporary account associated with the user before transferring the funds to an account of the user. In alternative examples, the payment network 115 can transfer the funds from the merchant's account to the user's account without using a temporary account.

FIGS. 1-4K, the corresponding text, and the examples, provide a number of different systems and devices for sending and receiving payments using an integrated electronic payment and messaging system. In addition to the foregoing, embodiments can be described in terms of flowcharts comprising acts and steps in a method for accomplishing a particular result. For example, FIGS. 5 and 6 illustrate flowcharts of exemplary methods in accordance with one or more embodiments.

Figure 5:
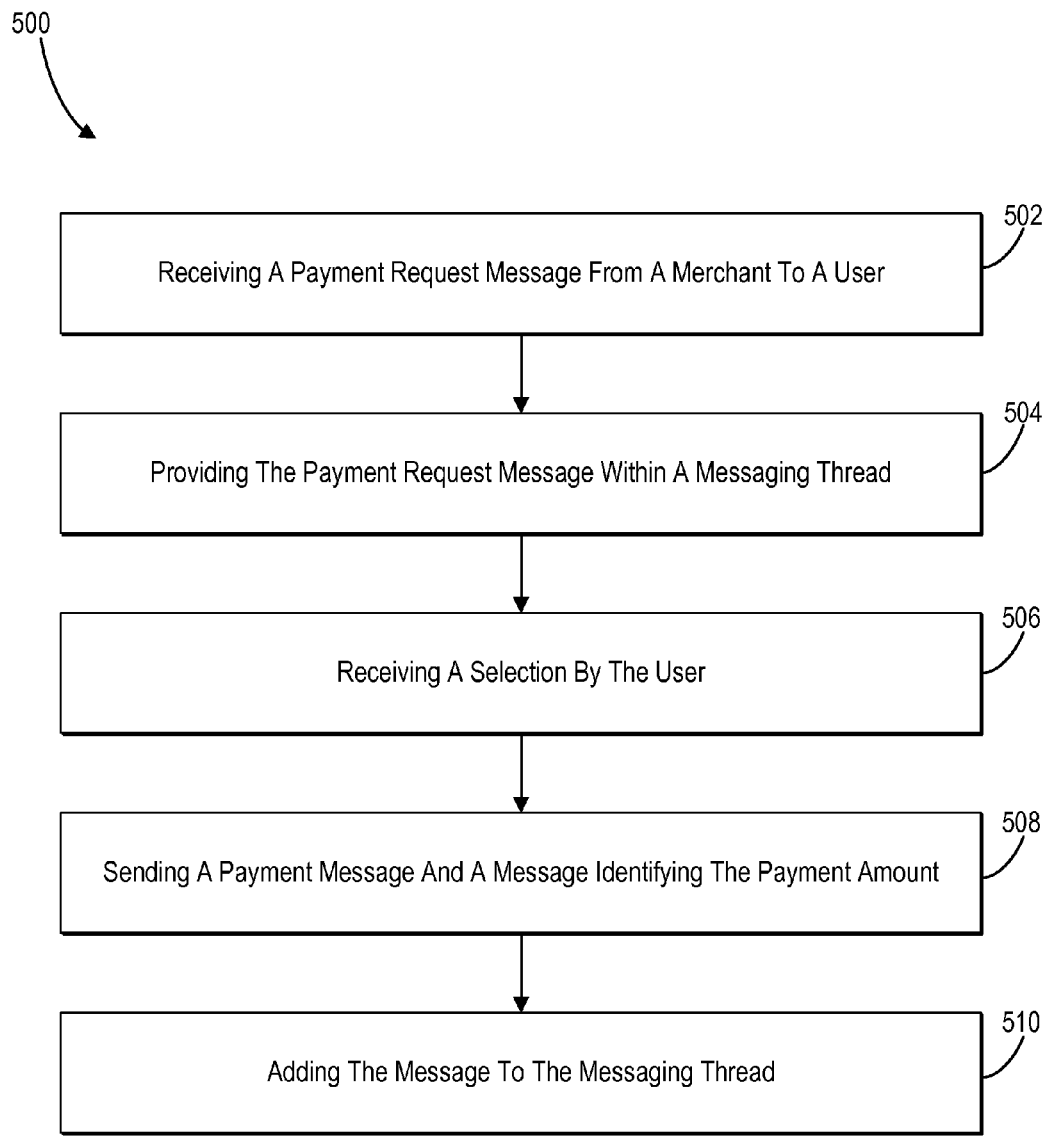
FIG. 5 illustrates a flow chart of a series of acts in a method of facilitating a peer-to-business payment transaction in accordance with one or more embodiments.
Figure 6:
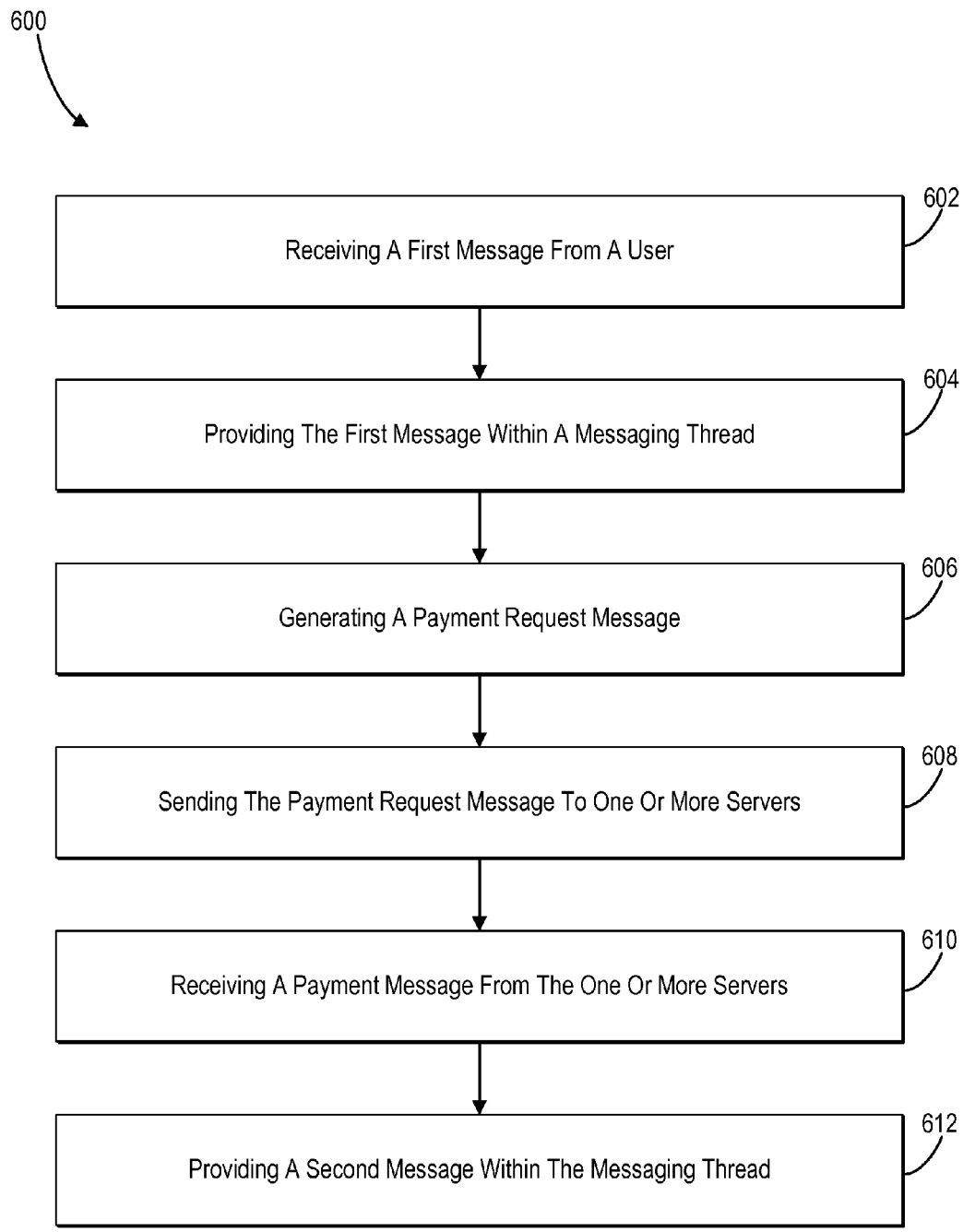
FIG. 6 illustrates a flow chart of a series of acts in another method of facilitating a peer-to-business payment transaction in accordance with one or more embodiments.

FIG. 5 illustrates a flowchart of a method 500 of facilitating peer-to-business payments. The method 500 includes an act 502 of receiving a payment request message from a merchant to a user. For example, act 502 involves receiving, at a client device 200a, 400a of the user, a payment request message from a merchant to the user, the payment request message including a payment amount and a transaction identifier. For instance, the payment request message can include a payment amount of a payment transaction between the merchant and the user in connection with a product from the merchant.

The method 500 also includes an act 504 of providing the payment request message within a messaging thread 416. For example, act 504 involves providing the payment request message within a messaging thread 416 between the user and the merchant, the messaging thread 416 being within a messaging user interface 414 of a messaging application. To illustrate, act 504 can involve providing the payment amount within the messaging thread on a display device of the client device 200a, 400a of the user.

As part of act 504, or as an additional act, the method 500 can also include converting the payment amount of the payment request message into a selectable element 426 within the messaging thread. Additionally, the payment request message can include a user identifier, a merchant identifier, and a messaging thread identifier in association with the messaging thread between the user and the merchant.

Additionally, the method 500 includes an act 506 of receiving a selection by the user. For example, act 506 involves receiving a selection by the user to pay the merchant the payment amount. To illustrate, act 506 can involve receiving a selection of the selectable element 426 within the messaging thread 416. Alternatively, act 506 can involve identifying a payment amount entered by the user, and receiving a selection of a pay element 434 within the messaging interface 414.

The method 500 further includes an act 508 of sending a payment message and a message identifying the payment amount. For example, act 508 involves sending, to one or more servers associated with the messaging application, a payment message including the payment amount and the transaction identifier and a message identifying the payment amount. Act 508 can also involve sending the payment message to the one or more servers associated with the messaging application while sending a second message to a client device 200b, 400b of the merchant in parallel, the second message indicating the payment transaction.

As part of act 508, or as an additional act, the method 500 can include detecting a location of the client device 200a, 400a of the user. The method 500 can include sending the detected location to the one or more servers associated with the messaging application. Additionally, the method 500 can include receiving an indication that the client device 200a, 400a is proximate a location of the merchant. The method 500 can also include identifying a merchant identifier for the merchant and providing, within the messaging thread, a request to add the merchant as a messaging contact. For example, the method 500 can include determining that a location of the client device 200a, 400a of the user has entered a geo-fence for the merchant.

As part of act 508, or as an additional act, the method 500 can include identifying a user preference to allow the merchant to contact the user when the client device 200a, 400a of the user is proximate a location of the merchant. The method 500 can also involve sending, to the merchant, a notification comprising a user identifier for the user and contact information for the user. The method 500 can also include identifying that the user preference allows the merchant to contact the user using the messaging application without requiring the merchant to obtain explicit permission from the user. For example, the method 500 can include receiving advertisements from the merchant based on the user preference.

The method 500 also includes an act 510 of adding the message to the messaging thread. For example, act 510 involves adding the message identifying the payment amount to the messaging thread 416 between the user and the merchant. Act 510 can also involve adding the message to the messaging thread 416 between the user and the merchant in a time-dependent flow of a conversation including the user and the merchant. Additionally, act 510 can involve formatting content of the payment message to indicate the payment transaction between the user and the merchant for the payment amount.

As part of act 510, or as an additional act, the method 500 can also include receiving a selection by the user to request a refund for the payment transaction. The method 500 can involve sending a refund request message 450 to the one or more servers associated with the messaging application that includes the transaction identifier. The method 500 can also include adding the refund request message 450 to the messaging thread 416 between the user and the merchant.

FIG. 6 illustrates a flowchart of another method 600 of facilitating peer-to-business payments. The method 600 includes an act 602 of receiving a first message from a user. For example, act 602 involves receiving, at a client device 200b, 400b of a merchant, a first message from a user indicating a product the user desires to purchase. Act 602 can also involve obtaining a product identifier based on a mapping of the indicated product to the identifier of the product in a product listing. For example, act 602 can involve identifying pricing and deals associated with the indicated product using the product identifier.

The method 600 further includes an act 604 of providing the first message within a messaging thread 416a. For example, act 604 involves providing, by the at least one processor, the first message within a messaging thread 416a between the user and the merchant. The messaging thread 416a being within a messaging user interface 414a of a messaging application. Additionally, act 604 can involve providing the first message within a time-dependent flow of a conversation of the messaging thread 416a between the user and the merchant.

The method 600 also includes an act 606 of generating a payment request message. For example, act 606 involves generating a payment request message with a payment amount for the product. Act 606 can involve generating a payment request message based on an input from the merchant within a messaging interface 414a of the messaging application. For example, act 606 can involve receiving an input of a product identifier from the merchant and determining the payment amount for the product based on the product identifier.

Additionally, the method 600 includes an act 608 of sending the payment request message to one or more servers. For example, act 608 involves sending, to one or more servers associated with the messaging application, the payment request message for delivery to the user. For example, act 608 can involve sending the payment request message to a server that manages a messaging exchange between the user and the merchant.

The method 600 also includes an act 610 of receiving a payment message from the one or more servers. For example act 610 involves receiving a payment message from the one or more servers associated with the messaging application indicating that payment was received from the user. Additionally, act 610 can involve receiving a notification from the one or more servers that the payment amount was successfully debited from a payment credential of the user and credited to a payment credential of the merchant.

As part of act 610, or as an additional act, the method 600 can include generating a transaction identifier in response to the payment message from the one or more servers. The transaction identifier can be associated with the payment message and the messaging thread 516a. The method 600 can also include receiving, from the user, a request to refund the payment amount to the user in association with the transaction identifier. The method can further involve processing the request to refund the payment amount to a payment credential of the user. The method can then involve sending a refund message to the user indicating a successful refund for the payment amount.

The method 600 further includes an act 612 of providing a second message within the messaging thread 516a. For example, act 612 involves providing a second message within the messaging thread 516a between the user and the merchant indicating receipt of the payment amount. Additionally, act 612 can involve providing the second message within the time-dependent flow of the conversation of the messaging thread 516a in response to the received payment message.

As part of act 612, or as an additional act, the method 600 can include receiving an image of the user and providing the image of the user within the messaging thread 516a between the user and the merchant. The image can allow the merchant to verify the identity of the user. For example, the image of the user can include an image of the user in a legal form of photo identification.

Additionally, as part of act 612, or as an additional act, the method 600 can include receiving an indication that a client device 200a, 400a of the user is proximate a location of the merchant. In response to the received indication, the method 600 can include presenting the messaging thread 416a between the user and the merchant on a display device of the client device 200b, 400b of the merchant. For example, the method 600 can include determining that the messaging thread 516a is not in focus on the display device of the client device 200b, 400b of the merchant, and bringing the messaging thread 516a in focus on the display device of the client device 200b, 400b of the merchant in response to the received indication. Additionally, or alternatively, in response to the received indication, the method 600 can include adding the user to a list of contacts for the merchant. The method 600 can also involve providing, within the messaging thread 516a between the user and the merchant, a notification that the user was added to the list of contacts for the merchant. Additionally, or alternatively, the method 600 can include sending, within the messaging thread 516a, a product listing to the user in response to the received indication.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 7 illustrates a block diagram of exemplary computing device 700 that may be configured to perform one or more of the processes described above. One will appreciate that one or more computing devices such as the computing device 700 may implement the payment system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touchscreen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social-networking system may enable its users (such as persons or organizations) to interact with the system and with each other. As mentioned above, the system 100 can comprise a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 8:
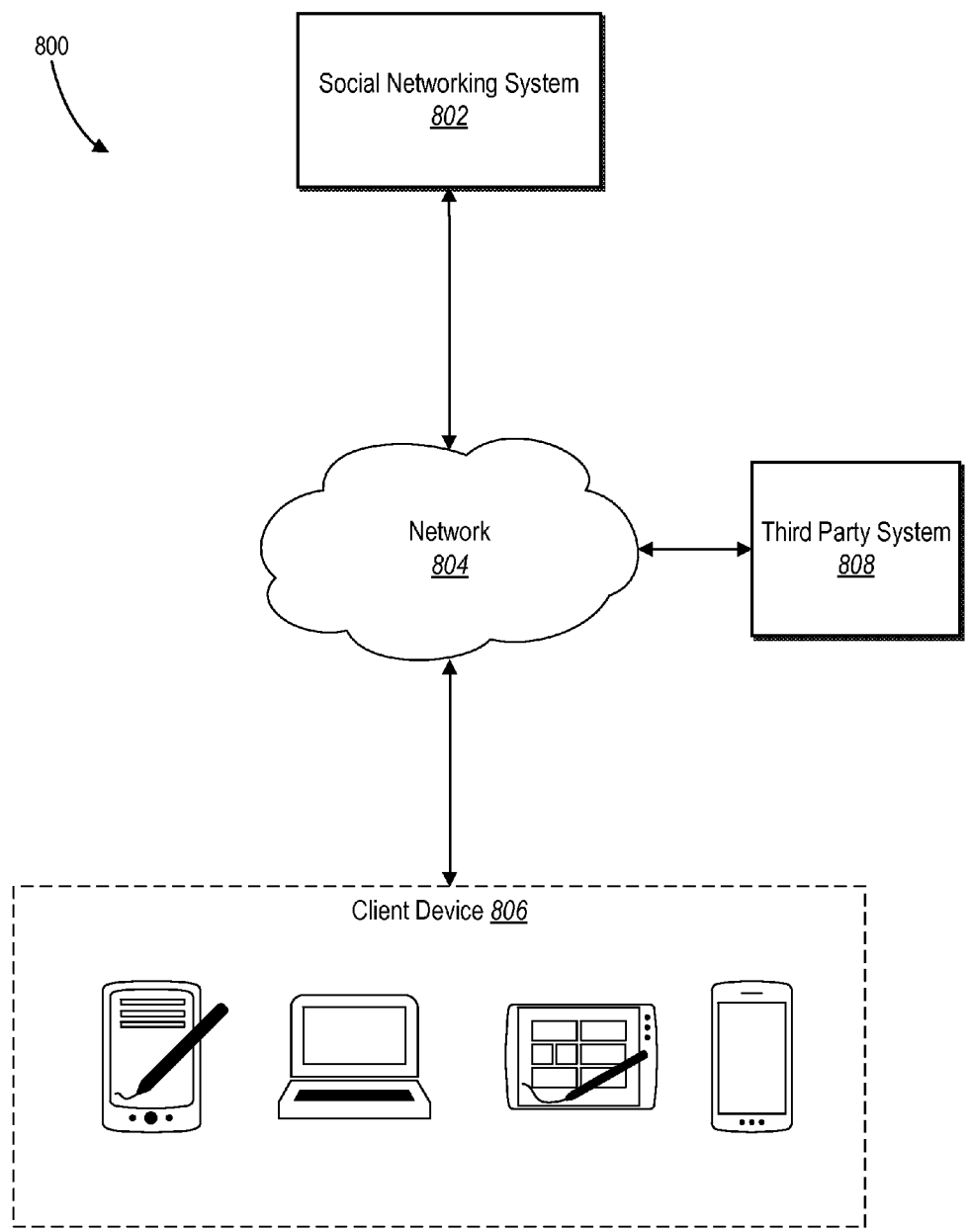
FIG. 8 illustrates an example network environment of a social-networking system in accordance with one or more embodiments.

FIG. 8 illustrates an example network environment 800 of a social-networking system. Network environment 800 includes a client system 806, a social-networking system 802, and a third-party system 808 connected to each other by a network 804. Although FIG. 8 illustrates a particular arrangement of client system 806, social-networking system 802, third-party system 808, and network 804, this disclosure contemplates any suitable arrangement of client system 806, social-networking system 802, third-party system 808, and network 804. As an example and not by way of limitation, two or more of client system 806, social-networking system 802, and third-party system 808 may be connected to each other directly, bypassing network 804. As another example, two or more of client system 806, social-networking system 802, and third-party system 808 may be physically or logically co-located with each other in whole or in part. Moreover, although FIG. 8 illustrates a particular number of client systems 806, social-networking systems 802, third-party systems 808, and networks 804, this disclosure contemplates any suitable number of client systems 806, social-networking systems 802, third-party systems 808, and networks 804. As an example and not by way of limitation, network environment 800 may include multiple client system 806, social-networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client system 806, social-networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include any of the computing devices discussed above in relation to FIG. 7. A client system 806 may enable a network user at client system 806 to access network 804. A client system 806 may enable its user to communicate with other users at other client systems 806.

In particular embodiments, client system 806 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 802 may be a network-addressable computing system that can host an online social network. Social-networking system 802 may generate, store, receive, and send social-networking data, such as, for example, user-profile data, concept-profile data, social-graph information, or other suitable data related to the online social network. Social-networking system 802 may be accessed by the other components of network environment 800 either directly or via network 804. In particular embodiments, social-networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 806, a social-networking system 802, or a third-party system 808 to manage, retrieve, modify, add, or delete, the information stored in data store.

In particular embodiments, social-networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 802 may provide users of the online social network the ability to communicate and interact with other users. In particular embodiments, users may join the online social network via social-networking system 802 and then add connections (e.g., relationships) to a number of other users of social-networking system 802 whom they want to be connected to. Herein, the term "friend" may refer to any other user of social-networking system 802 with whom a user has formed a connection, association, or relationship via social-networking system 802.

In particular embodiments, social-networking system 802 may provide users with the ability to take actions on various types of items or objects, supported by social-networking system 802. As an example and not by way of limitation, the items and objects may include groups or social networks to which users of social-networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 802 or by an external system of third-party system 808, which is separate from social-networking system 802 and coupled to social-networking system 802 via a network 804.

In particular embodiments, social-networking system 802 may be capable of linking a variety of entities. As an example and not by way of limitation, social-networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social-networking system 802. In particular embodiments, however, social-networking system 802 and third-party systems 808 may operate in conjunction with each other to provide social-networking services to users of social-networking system 802 or third-party systems 808. In this sense, social-networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client system 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 802 also includes user-generated content objects, which may enhance a user's interactions with social-networking system 802. User-generated content may include anything a user can add, upload, send, or "post" to social-networking system 802. As an example and not by way of limitation, a user communicates posts to social-networking system 802 from a client system 806. Posts may include data such as status updates or other textual data, location information, photos, videos, links, music or other similar data or media. Content may also be added to social-networking system 802 by a third-party through a "communication channel," such as a newsfeed or stream.

In particular embodiments, social-networking system 802 may include a variety of servers, sub-systems, programs, modules, logs, and data stores. In particular embodiments, social-networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 802 may also include suitable components such as network interfaces, security mechanisms, load balancers, failover servers, management-and-network-operations consoles, other suitable components, or any suitable combination thereof. In particular embodiments, social-networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 802 to one or more client systems 806 or one or more third-party system 808 via network 804. The web server may include a mail server or other messaging functionality for receiving and routing messages between social-networking system 802 and one or more client systems 806. An API-request server may allow a third-party system 808 to access information from social-networking system 802 by calling one or more APIs. An action logger may be used to receive communications from a web server about a user's actions on or off social-networking system 802. In conjunction with the action log, a third-party-content-object log may be maintained of user exposures to third-party-content objects. A notification controller may provide information regarding content objects to a client system 806. Information may be pushed to a client system 806 as notifications, or information may be pulled from client system 806 responsive to a request received from client system 806. Authorization servers may be used to enforce one or more privacy settings of the users of social-networking system 802. A privacy setting of a user determines how particular information associated with a user can be shared. The authorization server may allow users to opt in to or opt out of having their actions logged by social-networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client systems 806 associated with users. Advertisement-pricing modules may combine social information, the current time, location information, or other suitable information to provide relevant advertisements, in the form of notifications, to a user.

Figure 9:
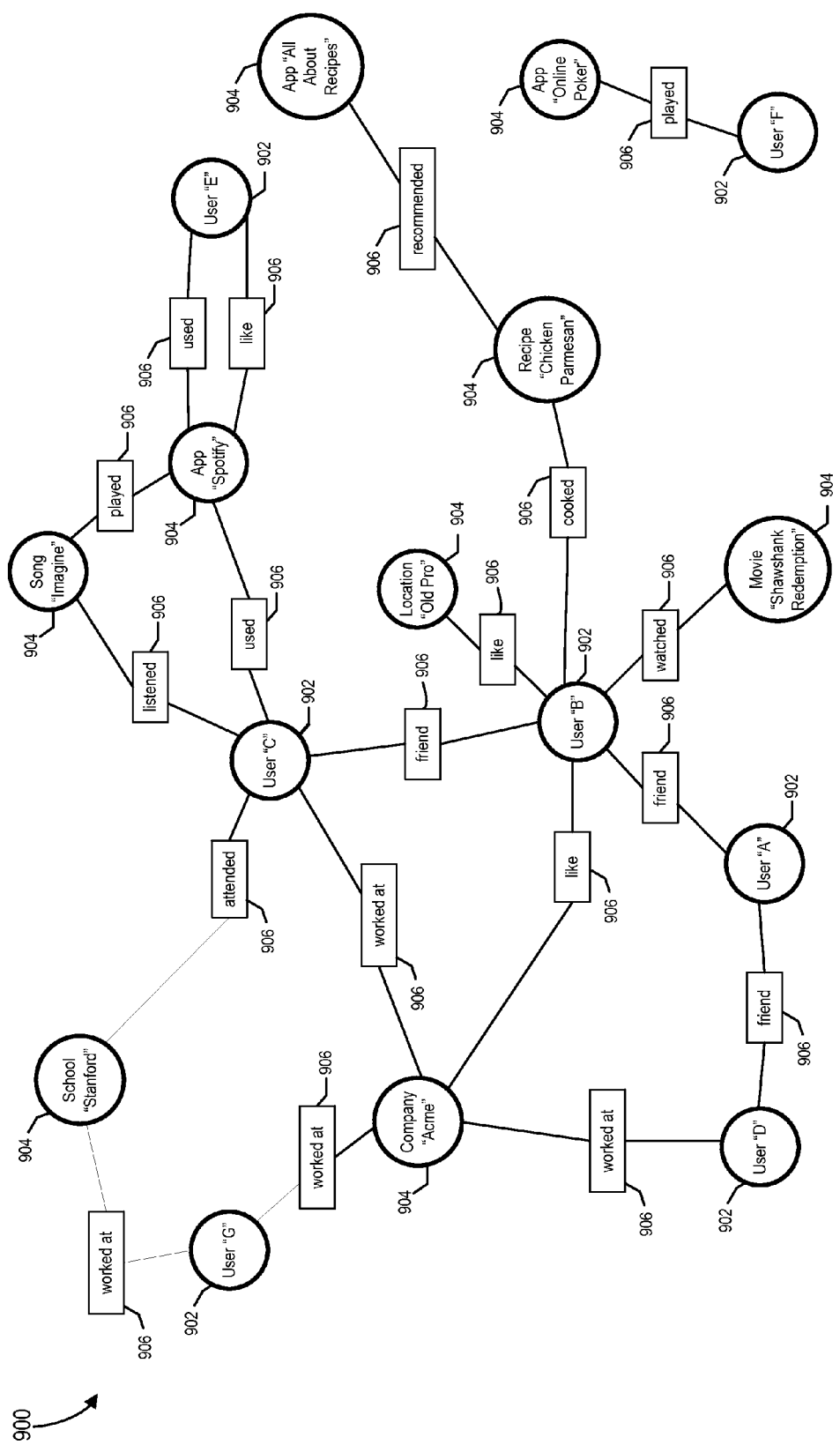
FIG. 9 illustrates an example social graph for a social-networking system in accordance with one or more embodiments.

FIG. 9 illustrates example social graph 900. In particular embodiments, social-networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 802, client system 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social-networking system 802. As an example and not by way of limitation, a user may be an individual (human user), an entity (e.g., an enterprise, business, or third-party application), or a group (e.g., of individuals or entities) that interacts or communicates with or over social-networking system 802. In particular embodiments, when a user registers for an account with social-networking system 802, social-networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 802. In particular embodiments, a user node 902 may be associated with information provided by a user or information gathered by various systems, including social-networking system 802. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social-networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social-networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 802. Profile pages may also be hosted on third-party websites associated with a third-party server 808. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 806 to send to social-networking system 802 a message indicating the user's action. In response to the message, social-networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 802 may send a "friend request" to the second user. If the second user confirms the "friend request," social-networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 802 may create an edge 906 between a user node 902 and a concept node 904 in social graph 900. As an example and not by way of limitation, a user viewing a concept-profile page (such as, for example, by using a web browser or a special-purpose application hosted by the user's client system 806) may indicate that he or she likes the concept represented by the concept node 904 by clicking or selecting a "Like" icon, which may cause the user's client system 806 to send to social-networking system 802 a message indicating the user's liking of the concept associated with the concept-profile page. In response to the message, social-networking system 802 may create an edge 906 between user node 902 associated with the user and concept node 904, as illustrated by "like" edge 906 between the user and concept node 904. In particular embodiments, social-networking system 802 may store an edge 906 in one or more data stores. In particular embodiments, an edge 906 may be automatically formed by social-networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 802) or RSVP (e.g., through social-networking system 802) to an event associated with the advertisement. In addition or as an alternative, an advertisement may include social-networking-system context directed to the user. As an example and not by way of limitation, an advertisement may display information about a friend of the user within social-networking system 802 who has taken an action associated with the subject matter of the advertisement.

In particular embodiments, social-networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 802 may calculate a coefficient based on a user's actions. Social-networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social-networking system 802 may analyze a user's actions to determine whether one or more of the actions indicate an affinity for subject matter, content, other users, and so forth. As an example and not by way of limitation, if a user may make frequently posts content related to "coffee" or variants thereof, social-networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 802 may calculate a coefficient based on the type of relationship between particular objects. Referencing the social graph 900, social-networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 802 may determine that the user has a higher coefficient with respect to the first photo than the second photo because having a tagged-in-type relationship with content may be assigned a higher weight and/or rating than having a like-type relationship with content. In particular embodiments, social-networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 802 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 806 of the user). A first user may be more interested in other users or concepts that are closer to the first user. As an example and not by way of limitation, if a user is one mile from an airport and two miles from a gas station, social-networking system 802 may determine that the user has a higher coefficient for the airport than the gas station based on the proximity of the airport to the user.

In particular embodiments, social-networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 802 may provide information that is relevant to user's interests and current circumstances, increasing the likelihood that they will find such information of interest. In particular embodiments, social-networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social-networking system 802 may calculate the coefficient (or access the coefficient information if it has previously been calculated and stored). In particular embodiments, social-networking system 802 may measure an affinity with respect to a particular process. Different processes (both internal and external to the online social network) may request a coefficient for a particular object or set of objects. Social-networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social-networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 802 may send a request to the data store for the object. The request may identify the user associated with the request and may only be sent to the user (or a client system 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   providing, to one or more servers associated with a payment system, location information of a client device of a user;
   in response to receiving, at the client device of the user, an indication that the client device of the user is within a predefined proximity of a location of a merchant: indicating that the client device of the user is within the predefined proximity of the location of the merchant, and accessing a messaging thread between the user and the merchant on a display device of the client device of the user, wherein accessing the messaging thread comprises opening a conversation between the user and the merchant within a messaging user interface of a messaging application;
   receiving, at the client device of the user, a product listing comprising a plurality of products available from the merchant;
   providing one or more of the products from the product listing in the messaging thread;
   sending, to the one or more servers in response to a selected product from within the messaging application, a product identifier for the selected product;
   receiving, at the client device of the user, a payment request message from the merchant to the user, the payment request message including a payment amount corresponding to the selected product and a transaction identifier;
   providing, by at least one processor of the client device of the user, the payment request message within the messaging thread between the user and the merchant;
   receiving, by the at least one processor, a selection by the user to pay the merchant the payment amount;
   sending, to the one or more servers associated with the messaging application, a payment message including the payment amount and the transaction identifier and a second message identifying the payment amount for displaying within the messaging thread; and
   adding the second message to the messaging thread between the user and the merchant.

2. The method as recited in claim 1, further comprising converting the payment amount of the payment request message into a selectable element in a time-dependent flow of the conversation within the messaging thread.

3. The method as recited in claim 2, wherein receiving the selection by the user comprises receiving a selection of the selectable element within the messaging thread.

4. The method as recited in claim 1, wherein receiving the selection by the user comprises:
   identifying a payment amount entered by the user; and
   receiving a selection of a pay element within the messaging interface.

5. The method as recited in claim 1, wherein accessing the messaging thread between the user and the merchant on the display device of the client device of the user comprises:
   determining that a messaging graphical user interface is not in focus on the display device of the client device of the user; and
   opening, in response to determining that the location of the client device of the user is within a geo-fence of the merchant, the messaging graphical user interface of the client device of the user to present the messaging thread comprising the conversation between the user and the merchant on the display device of the client device of the user.

6. The method as recited in claim 1, further comprising:
   receiving an indication of successful authorization for the payment amount from the one or more servers; and
   providing, within a flow of the conversation within the messaging thread, the indication of successful authorization for the payment amount.

7. A method comprising:
   receiving, at a client device of a merchant, an indication that a client device of a user is within a predefined proximity of a location of the merchant;
   in response to the received indication, accessing a messaging thread between the user and the merchant on a display device of the client device of the merchant, wherein accessing the messaging thread comprises opening a conversation between the user and the merchant within a messaging user interface of a messaging application;
   sending, to the client device of the user, a product listing within the messaging thread, the product listing comprising a plurality of products available from the merchant;
   receiving, at the client device of the merchant and within the messaging thread, a first message from the user indicating a product the user desires to purchase from the plurality of products in the product listing, the first message comprising a product identifier corresponding to the product;
   providing, by at least one processor of the client device of the merchant, the first message within the messaging thread between the user and the merchant;
   generating, by the at least one processor, a payment request message with a payment amount for the product corresponding to the product identifier;
   sending, by the at least one processor to one or more servers associated with the messaging application, the payment request message for delivery to the user;
   receiving a payment message from the one or more servers associated with the messaging application indicating that payment amount was received from the user; and
   providing, by the at least one processor, a second message within the messaging thread between the user and the merchant, the second message indicating receipt of the payment amount.

8. The method as recited in claim 7, further comprising:
generating a transaction identifier in response to the payment message from the one or more servers, the transaction identifier being associated with the payment message and the messaging thread;
receiving, from the user, a request to refund the payment amount to the user in association with the transaction identifier;
processing the request to refund the payment amount to a payment credential of the user; and
sending a refund message to the user indicating a successful refund for the payment amount.

9. The method as recited in claim 7, further comprising:
receiving an image of the user;
providing the image of the user within a time-dependent flow of the conversation of the messaging thread between the user and the merchant to allow the merchant to verify the identity of the user; and
comparing, using image recognition techniques, the image of the user to stored information in a messaging database to verify the identity of the user.

10. The method as recited in claim 7, wherein accessing the messaging thread between the user and the merchant comprises opening a messaging graphical user interface at the client device of the merchant, the messaging graphical user interface comprising the messaging thread between the user and the merchant.

11. The method as recited in claim 7, further comprising:
in response to the received indication, adding the user to a list of contacts for the merchant; and
providing, within the messaging thread between the user and the merchant, a notification that the user was added to the list of contacts for the merchant.

12. The method as recited in claim 7, wherein accessing the messaging thread between the user and the merchant comprises:
determining that a messaging graphical user interface is not in focus on the display device of the client device of the merchant; and
opening, in response to determining that the location of the client device of the user is within a geo-fence of the merchant, the messaging graphical user interface of the client device of the merchant to present the messaging thread comprising the conversation between the user and the merchant on the display device of the client device of the merchant.

13. The method as recited in claim 7, wherein the product identifier comprises an object identifier corresponding to a product node in a social graph, the product node being associated with a merchant node corresponding to the merchant.

14. A system comprising:
at least one processor; and
at least one non-transitory computer readable storage medium storing instructions thereon, that, when executed by the at least one processor, cause the system to:
receive, from a client device of a user, location information of the client device of the user;
determine that a location of the client device of the user is within a predefined proximity of a location of a merchant;
in response to determining that the location of the client device of the user is within the predefined proximity, access a messaging thread between the user and the merchant for display at the client device of the user and for display at a client device of the merchant, wherein accessing the messaging thread comprises opening a conversation between the user and the merchant within messaging user interfaces of a messaging application;
receive, from the client device of the merchant and within the messaging thread, a product listing comprising a plurality of products available from the merchant;
provide, to the client device of the user, the product listing within the messaging thread;
receive, from the client device of the user and from within the messaging application, a selected product corresponding to a product identifier;
receive, from a user messaging account associated with the user, a payment message directed to a merchant messaging account associated with the merchant within the messaging thread, the payment message indicating a payment amount corresponding to the selected product;
send, to a payment network, an authorization request against a payment credential of the user for the payment amount;
receive a positive payment authorization response from the payment network;
in response to the positive payment authorization response, forward the payment message to the merchant messaging account;
send a payment transaction request to the payment network for the payment amount from the payment credential of the user;
receive a transfer of funds for the payment amount from the payment network; and
store the transfer of funds in a temporary account for the merchant.

15. The system as recited in claim 14, further comprising instructions that, when executed by the at least one processor, cause the system to:
associate a transaction identifier with the funds for the payment amount.

16. The system as recited in claim 15, further comprising instructions that, when executed by the at least one processor, cause the system to:
send a payment processed message comprising the transaction identifier to the merchant.

17. The system as recited in claim 15, further comprising instructions that, when executed by the at least one processor, cause the system to:
receive a refund request from the user messaging account;
send a refund for the payment amount to the payment network for crediting the payment credential of the user;
debit the payment amount from the temporary account; and
send a refund message to the user messaging account and to the merchant messaging account for display within the messaging thread.

18. The system as recited in claim 14, further comprising instructions that, when executed by the at least one processor, cause the system to:
send a settlement payment to the payment network for crediting to a payment credential of the merchant, the settlement payment comprising the transfer of funds for the payment amount.

19. The system as recited in claim 14, further comprising instructions that, when executed by the at least one processor, cause the system to:
identify a merchant identifier for the merchant; and
send, to the client device of the user in response to determining that the location of the client device of the user is within the predefined proximity of the location of the merchant, a request to add the merchant as a messaging contact.

20. The system as recited in claim 14, further comprising instructions that, when executed by the at least one processor, cause the system to:
   identify the location of the client device of the user;
   identify a user preference to allow the merchant to contact the user when the client device of the user is within the predefined proximity of the location of the merchant; and
   send, to the merchant in response to the client device of the user being within the predefined proximity of the location of the merchant, a notification comprising a user identifier for the user and contact information for the user.

\* \* \* \* \*